United States Patent
Sarvazyan

(10) Patent No.: US 12,539,043 B2
(45) Date of Patent: Feb. 3, 2026

(54) LESION VISUALIZATION USING DUAL WAVELENGTH APPROACH

(71) Applicant: The George Washington University, Washington, DC (US)

(72) Inventor: Narine Sarvazyan, Lambertville, NJ (US)

(73) Assignee: The George Washington University, Washington, DC (US)

( * ) Notice: Subject to any disclaimer, the term of this patent is extended or adjusted under 35 U.S.C. 154(b) by 800 days.

(21) Appl. No.: 17/332,528

(22) Filed: May 27, 2021

(65) Prior Publication Data

US 2021/0369118 A1 Dec. 2, 2021

Related U.S. Application Data

(60) Provisional application No. 63/030,572, filed on May 27, 2020.

(51) Int. Cl.
*A61B 5/00* (2006.01)
*A61B 17/32* (2006.01)
(Continued)

(52) U.S. Cl.
CPC .......... *A61B 5/0071* (2013.01); *A61B 5/0084* (2013.01); *A61B 5/742* (2013.01);
(Continued)

(58) Field of Classification Search
None
See application file for complete search history.

(56) References Cited

U.S. PATENT DOCUMENTS 3,387,305 A 6/1968 Shafer
3,831,467 A 8/1974 Moore
(Continued)

FOREIGN PATENT DOCUMENTS

CN 1289239 3/2001
CN 1764419 4/2006
(Continued)

OTHER PUBLICATIONS

Swift, Luther M., et al. "Hyperspectral imaging for label-free in vivo identification of myocardial scars and sites of radiofrequency ablation lesions." Heart Rhythm 15.4 (2018): 564-575. (Year: 2018).*

(Continued)

*Primary Examiner* — Jacqueline Cheng
*Assistant Examiner* — Jairo H Portillo
(74) *Attorney, Agent, or Firm* — Greenberg Traurig, LLP; Roman Fayerberg; David J. Dykeman

(57) ABSTRACT

The present disclosure provides a system for interrogating tissue comprising a light source for illuminating tissue comprising lesions from ablation and a sensor being configured to receive light to detect autofluorescence from the illuminated tissue. The sensor detects light at a first wavelength in a first wavelength range such that the first wavelength range includes a peak intensity of autofluorescence from the illuminated tissue and detecting light at a second wavelength in a second wavelength range such that the second wavelength range is 20 nm-100 nm longer than the first wavelength range. A processor is programmed to generate a first digital representation of the tissue from light detected in the first wavelength range and a second digital representation of the tissue from light detected in the second wavelength range, and generate a final digital representation from the first and second digital representations. The final (Continued)

digital representation distinguishes between ablated and non-ablated tissue.

16 Claims, 24 Drawing Sheets

(51) Int. Cl.
 *A61B 18/02* (2006.01)
 *A61B 18/06* (2006.01)
 *A61B 18/08* (2006.01)
 *A61B 18/14* (2006.01)
 *A61B 18/18* (2006.01)
 *A61B 18/24* (2006.01)
 *A61B 18/00* (2006.01)

(52) U.S. Cl.
 CPC ...... *A61B 17/320068* (2013.01); *A61B 18/02* (2013.01); *A61B 18/06* (2013.01); *A61B 18/082* (2013.01); *A61B 18/1492* (2013.01); *A61B 18/18* (2013.01); *A61B 18/1815* (2013.01); *A61B 18/24* (2013.01); *A61B 2017/320069* (2017.08); *A61B 2018/0022* (2013.01); *A61B 2018/00577* (2013.01); *A61B 2018/0212* (2013.01); *A61B 2018/1861* (2013.01)

(56) References Cited

U.S. PATENT DOCUMENTS

| | | | |
|---|---|---|---|
| 4,024,873 A | 5/1977 | Antoshkiw et al. |
| 4,619,247 A | 10/1986 | Inoue et al. |
| 5,074,306 A | 12/1991 | Green et al. |
| 5,187,572 A | 2/1993 | Nakamura et al. |
| 5,350,375 A | 9/1994 | Deckelbaum et al. |
| 5,419,323 A | 5/1995 | Kittrell et al. |
| 5,421,337 A | 6/1995 | Richards-Kortum et al. |
| 5,507,287 A | 4/1996 | Palcic et al. |
| 5,540,681 A | 7/1996 | Strul et al. |
| 5,584,799 A | 12/1996 | Gray |
| 5,590,660 A | 1/1997 | MacAulay et al. |
| 5,657,760 A | 8/1997 | Ying et al. |
| 5,713,364 A | 2/1998 | DeBaryshe et al. |
| 5,749,830 A | 5/1998 | Kaneko et al. |
| 5,833,688 A | 11/1998 | Sieben et al. |
| 5,885,258 A | 3/1999 | Sachdeva et al. |
| 5,904,651 A | 5/1999 | Swanson et al. |
| 5,954,665 A | 9/1999 | Haim |
| 6,064,069 A | 5/2000 | Nakano et al. |
| 6,112,123 A | 8/2000 | Kelleher et al. |
| 6,124,597 A | 9/2000 | Shehada et al. |
| 6,174,291 B1 | 1/2001 | McMahon et al. |
| 6,178,346 B1 | 1/2001 | Amundson et al. |
| 6,197,021 B1 | 3/2001 | Panescu et al. |
| 6,208,886 B1 | 3/2001 | Alfano et al. |
| 6,217,573 B1 | 4/2001 | Webster et al. |
| 6,219,566 B1 | 4/2001 | Weersink et al. |
| 6,251,107 B1 | 6/2001 | Schaer |
| 6,289,236 B1 | 9/2001 | Koenig et al. |
| 6,309,352 B1 | 10/2001 | Oraevsky et al. |
| 6,343,228 B1 | 1/2002 | Qu |
| 6,423,055 B1 | 7/2002 | Farr et al. |
| 6,423,057 B1 | 7/2002 | He et al. |
| 6,450,971 B1 | 9/2002 | Andrus et al. |
| 6,485,413 B1 | 11/2002 | Boppart et al. |
| 6,516,217 B1 | 2/2003 | Tsujita |
| 6,522,913 B2 | 2/2003 | Swanson et al. |
| 6,542,767 B1 | 4/2003 | McNichols et al. |
| 6,572,609 B1 | 6/2003 | Farr et al. |
| 6,584,360 B2 | 6/2003 | Francischelli et al. |
| 6,626,900 B1 | 9/2003 | Sinofsky et al. |
| 6,648,883 B2 | 11/2003 | Francischelli et al. |
| 6,658,279 B2 | 12/2003 | Swanson et al. |
| 6,663,622 B1 | 12/2003 | Foley et al. |
| 6,663,627 B2 | 12/2003 | Francischelli et al. |
| 6,671,535 B1 | 12/2003 | McNichols et al. |
| 6,697,657 B1 | 2/2004 | Shehada et al. |
| 6,706,038 B2 | 3/2004 | Francischelli et al. |
| 6,716,196 B2 | 4/2004 | Lesh et al. |
| 6,743,225 B2 | 6/2004 | Sanchez et al. |
| 6,746,401 B2 | 6/2004 | Panescu |
| 6,761,716 B2 | 7/2004 | Kadhiresan et al. |
| 6,825,928 B2 | 11/2004 | Liu et al. |
| 6,936,047 B2 | 8/2005 | Nasab et al. |
| 6,937,885 B1 | 8/2005 | Lewis et al. |
| 6,942,657 B2 | 9/2005 | Sinofsky et al. |
| 6,953,457 B2 | 10/2005 | Farr et al. |
| 6,974,454 B2 | 12/2005 | Hooven |
| 6,975,898 B2 | 12/2005 | Seibel |
| 6,975,899 B2 | 12/2005 | Faupel et al. |
| 6,979,290 B2 | 12/2005 | Mourlas et al. |
| 6,989,010 B2 | 1/2006 | Francischelli et al. |
| 7,001,383 B2 | 2/2006 | Keidar |
| 7,029,470 B2 | 4/2006 | Francischelli et al. |
| 7,047,068 B2 | 5/2006 | Haissaguerre |
| 7,130,672 B2 | 10/2006 | Pewzner et al. |
| 7,192,427 B2 | 3/2007 | Chapelon et al. |
| 7,207,984 B2 | 4/2007 | Farr et al. |
| 7,232,437 B2 | 6/2007 | Berman et al. |
| 7,235,045 B2 | 6/2007 | Wang et al. |
| 7,250,048 B2 | 7/2007 | Francischelli et al. |
| 7,252,664 B2 | 8/2007 | Nasab et al. |
| 7,255,695 B2 | 8/2007 | Falwell et al. |
| 7,289,205 B2 | 10/2007 | Yaroslavsky et al. |
| 7,306,593 B2 | 12/2007 | Keidar et al. |
| 7,338,485 B2 | 3/2008 | Brucker et al. |
| 7,357,796 B2 | 4/2008 | Farr et al. |
| 7,367,944 B2 | 5/2008 | Rosemberg et al. |
| 7,367,972 B2 | 5/2008 | Francischelli et al. |
| 7,417,740 B2 | 8/2008 | Alphonse et al. |
| 7,497,858 B2 | 3/2009 | Chapelon et al. |
| 7,527,625 B2 | 5/2009 | Knight et al. |
| 7,534,204 B2 | 5/2009 | Starksen et al. |
| 7,539,530 B2 | 5/2009 | Caplan et al. |
| 7,587,236 B2 | 9/2009 | Demos et al. |
| 7,591,816 B2 | 9/2009 | Wang et al. |
| 7,596,404 B2 | 9/2009 | Maier et al. |
| 7,598,088 B2 | 10/2009 | Balas |
| 7,640,046 B2 | 12/2009 | Pastore |
| 7,662,152 B2 | 2/2010 | Sharareh et al. |
| 7,681,579 B2 | 3/2010 | Schwartz |
| 7,727,229 B2 | 6/2010 | He et al. |
| 7,727,231 B2 | 6/2010 | Swanson |
| 7,729,750 B2 | 6/2010 | Tromberg et al. |
| 7,766,907 B2 | 8/2010 | Dando et al. |
| 7,776,033 B2 | 8/2010 | Swanson |
| 7,822,460 B2 | 10/2010 | Halperin et al. |
| 7,824,397 B2 | 11/2010 | McAuley |
| 7,824,399 B2 | 11/2010 | Francischelli et al. |
| 7,837,676 B2 | 11/2010 | Sinelnikov et al. |
| 7,846,157 B2 | 12/2010 | Kozel |
| 7,862,561 B2 | 1/2011 | Swanson et al. |
| 7,877,128 B2 | 1/2011 | Schwartz |
| 7,918,850 B2 | 4/2011 | Govari et al. |
| 7,930,016 B1 | 4/2011 | Saadat |
| 7,942,871 B2 | 5/2011 | Thapliyal et al. |
| 7,950,397 B2 | 5/2011 | Thapliyal et al. |
| 7,974,683 B2 | 7/2011 | Balaset et al. |
| 7,976,537 B2 | 7/2011 | Lieber et al. |
| 7,979,107 B2 | 7/2011 | Lin et al. |
| 7,992,573 B2 | 8/2011 | Wilson et al. |
| 7,996,078 B2 | 8/2011 | Paul et al. |
| 8,007,433 B2 | 8/2011 | Iketani |
| 8,024,027 B2 | 9/2011 | Freeman et al. |
| 8,025,661 B2 | 9/2011 | Arnold et al. |
| 8,050,746 B2 | 11/2011 | Saadat et al. |
| 8,078,266 B2 | 12/2011 | Saadat et al. |
| 8,123,742 B2 | 2/2012 | Berger |
| 8,123,745 B2 | 2/2012 | Beeckler et al. |
| 8,129,105 B2 | 3/2012 | Zuckerman |
| 8,131,350 B2 | 3/2012 | Saadat et al. |
| 8,137,333 B2 | 3/2012 | Saadat et al. |

(56) References Cited

U.S. PATENT DOCUMENTS

| | | |
|---|---|---|
| 8,144,966 B2 | 3/2012 | Provenzano et al. |
| 8,146,603 B2 | 4/2012 | Thapliyal et al. |
| 8,147,484 B2 | 4/2012 | Lieber et al. |
| 8,152,795 B2 | 4/2012 | Farr et al. |
| 8,160,680 B2 | 4/2012 | Boyden et al. |
| 8,175,688 B2 | 5/2012 | Lewis et al. |
| 8,180,436 B2 | 5/2012 | Boyden et al. |
| 8,188,446 B2 | 5/2012 | Ohno |
| 8,195,271 B2 | 6/2012 | Rahn |
| 8,203,709 B2 | 6/2012 | Ishii |
| 8,219,183 B2 | 7/2012 | Mashke et al. |
| 8,221,310 B2 | 7/2012 | Saadat et al. |
| 8,235,985 B2 | 8/2012 | Saadat et al. |
| 8,241,272 B2 | 8/2012 | Arnold et al. |
| 8,267,926 B2 | 9/2012 | Paul et al. |
| 8,277,444 B2 | 10/2012 | Arnold et al. |
| 8,298,227 B2 | 10/2012 | Leo et al. |
| 8,309,346 B2 | 11/2012 | Zuckerman |
| 8,317,783 B2 | 11/2012 | Cao et al. |
| 8,333,012 B2 | 12/2012 | Rothe et al. |
| 8,353,907 B2 | 1/2013 | Winkler et al. |
| 8,357,149 B2 | 1/2013 | Govari et al. |
| 8,366,705 B2 | 2/2013 | Arnold et al. |
| 8,369,922 B2 | 2/2013 | Paul et al. |
| 8,374,682 B2 | 2/2013 | Freeman et al. |
| 8,382,750 B2 | 2/2013 | Brannan |
| 8,403,925 B2 | 3/2013 | Miller et al. |
| 8,414,508 B2 | 4/2013 | Thapliyal et al. |
| 8,417,321 B2 | 4/2013 | Saadat et al. |
| 8,417,323 B2 | 4/2013 | Uzunbajakava et al. |
| 8,419,613 B2 | 4/2013 | Saadat et al. |
| 8,435,232 B2 | 5/2013 | Aeby et al. |
| 8,444,639 B2 | 5/2013 | Arnold et al. |
| 8,460,285 B2 | 6/2013 | Wang et al. |
| 8,463,366 B2 | 6/2013 | Freeman et al. |
| 8,500,730 B2 | 8/2013 | Lee et al. |
| 8,504,132 B2 | 8/2013 | Friedman et al. |
| 8,511,317 B2 | 8/2013 | Thapliyal et al. |
| 8,540,704 B2 | 9/2013 | Melsky et al. |
| 8,548,567 B2 | 10/2013 | Maschke et al. |
| 8,556,892 B2 | 10/2013 | Hong et al. |
| 8,583,220 B2 | 11/2013 | Schwartz |
| 8,603,084 B2 | 12/2013 | Fish et al. |
| 8,607,800 B2 | 12/2013 | Thapliyal et al. |
| 8,628,520 B2 | 1/2014 | Sharareh et al. |
| 8,641,705 B2 | 2/2014 | Leo et al. |
| 8,641,706 B2 | 2/2014 | Lieber et al. |
| 8,690,758 B2 | 4/2014 | Matsumoto |
| 8,702,690 B2 | 4/2014 | Paul et al. |
| 8,709,008 B2 | 4/2014 | Willis et al. |
| 8,728,077 B2 | 5/2014 | Paul et al. |
| 8,755,860 B2 | 6/2014 | Paul et al. |
| 8,774,906 B2 | 7/2014 | Harks et al. |
| 8,808,281 B2 | 8/2014 | Emmons et al. |
| 8,849,380 B2 | 9/2014 | Patwardhan |
| 8,858,495 B2 | 10/2014 | Tegg et al. |
| 8,876,817 B2 | 11/2014 | Avitall et al. |
| 8,882,697 B2 | 11/2014 | Celermajer et al. |
| 8,894,589 B2 | 11/2014 | Leo et al. |
| 8,894,641 B2 | 11/2014 | Brannan |
| 8,900,219 B2 | 12/2014 | Sinofsky et al. |
| 8,900,225 B2 | 12/2014 | Bar-Tal et al. |
| 8,900,228 B2 | 12/2014 | Grunewald et al. |
| 8,900,229 B2 | 12/2014 | Govari et al. |
| 8,906,011 B2 | 12/2014 | Gelbart et al. |
| 8,915,878 B2 | 12/2014 | Winkler et al. |
| 8,923,959 B2 | 12/2014 | Boveja et al. |
| 8,926,604 B2 | 1/2015 | Govari et al. |
| 8,929,973 B1 | 1/2015 | Webb et al. |
| 8,948,851 B2 | 2/2015 | Leblond et al. |
| 8,951,247 B2 | 2/2015 | Ding et al. |
| 8,986,292 B2 | 3/2015 | Sliwa et al. |
| 8,986,298 B2 | 3/2015 | Lee et al. |
| 8,998,890 B2 | 4/2015 | Paul et al. |
| 8,998,892 B2 | 4/2015 | Winkler et al. |
| 8,998,893 B2 | 4/2015 | Avitall |
| 9,008,746 B2 | 4/2015 | Pastore et al. |
| 9,014,789 B2 | 4/2015 | Mercader et al. |
| 9,084,611 B2 | 7/2015 | Amirana et al. |
| 9,087,368 B2 | 7/2015 | Tearney et al. |
| 9,186,066 B2 | 11/2015 | Tearney et al. |
| 9,220,411 B2 | 12/2015 | Hillman |
| 9,233,241 B2 | 1/2016 | Long |
| 9,277,865 B2 | 3/2016 | Yamaguchi et al. |
| 10,076,238 B2 | 9/2018 | Amirana et al. |
| 10,143,517 B2 | 12/2018 | Ransbury et al. |
| 10,568,535 B2 | 2/2020 | Roberts et al. |
| 10,682,179 B2 | 6/2020 | Ransbury et al. |
| 10,716,462 B2 | 7/2020 | Amirana et al. |
| 10,722,301 B2 | 7/2020 | Amirana et al. |
| 10,736,512 B2 | 8/2020 | Mercader et al. |
| 10,779,904 B2 | 9/2020 | Ransbury et al. |
| 11,096,584 B2 | 8/2021 | Mercader et al. |
| 11,457,817 B2 | 10/2022 | Sarvazyan |
| 11,559,192 B2 | 1/2023 | Amirana et al. |
| 11,559,352 B2 | 1/2023 | Amirana et al. |
| 12,075,980 B2 | 9/2024 | Amirana et al. |
| 12,076,081 B2 | 9/2024 | Amirana et al. |
| 2002/0042556 A1 | 4/2002 | Sugimoto et al. |
| 2002/0123666 A1 | 9/2002 | Matsumoto |
| 2002/0143326 A1 | 10/2002 | Foley et al. |
| 2003/0028188 A1 | 2/2003 | Paddock et al. |
| 2003/0120142 A1 | 6/2003 | Dubuc et al. |
| 2003/0120144 A1 | 6/2003 | Grabek et al. |
| 2003/0125719 A1 | 7/2003 | Furnish |
| 2003/0191368 A1* | 10/2003 | Wang .................. G01J 3/0232 600/476 |
| 2003/0208252 A1 | 11/2003 | O' Boyle et al. |
| 2004/0073206 A1 | 4/2004 | Foley et al. |
| 2004/0092806 A1 | 5/2004 | Sagon et al. |
| 2004/0097788 A1 | 5/2004 | Mourlas et al. |
| 2004/0138656 A1 | 7/2004 | Francischelli et al. |
| 2004/0187875 A1 | 9/2004 | He et al. |
| 2004/0215310 A1 | 10/2004 | Amirana |
| 2004/0267326 A1 | 12/2004 | Ocel et al. |
| 2005/0014995 A1 | 1/2005 | Amundson et al. |
| 2005/0043637 A1 | 2/2005 | Caplan et al. |
| 2005/0070987 A1 | 3/2005 | Erickson |
| 2005/0075629 A1 | 4/2005 | Chapelon et al. |
| 2005/0119523 A1 | 6/2005 | Starksen et al. |
| 2005/0119548 A1 | 6/2005 | Lin et al. |
| 2005/0197530 A1 | 9/2005 | Wallace et al. |
| 2005/0197623 A1 | 9/2005 | Leeflang et al. |
| 2005/0215899 A1 | 9/2005 | Trahey et al. |
| 2005/0228452 A1 | 10/2005 | Mourlas et al. |
| 2005/0251125 A1 | 11/2005 | Pless et al. |
| 2005/0283195 A1 | 12/2005 | Pastore et al. |
| 2006/0009756 A1 | 1/2006 | Francischelli et al. |
| 2006/0013454 A1 | 1/2006 | Flewelling et al. |
| 2006/0025760 A1 | 2/2006 | Podhajsky |
| 2006/0089636 A1 | 4/2006 | Christopherson et al. |
| 2006/0122583 A1 | 6/2006 | Pesach et al. |
| 2006/0122587 A1 | 6/2006 | Sharareh |
| 2006/0184048 A1 | 8/2006 | Saadat |
| 2006/0229515 A1 | 10/2006 | Sharareh et al. |
| 2006/0229594 A1 | 10/2006 | Francischelli et al. |
| 2006/0278246 A1 | 12/2006 | Eng et al. |
| 2007/0015964 A1 | 1/2007 | Eversull et al. |
| 2007/0016079 A1 | 1/2007 | Freeman et al. |
| 2007/0016130 A1 | 1/2007 | Leeflang et al. |
| 2007/0038126 A1 | 2/2007 | Pyle et al. |
| 2007/0049827 A1 | 3/2007 | Donaldson et al. |
| 2007/0083217 A1 | 4/2007 | Eversull et al. |
| 2007/0167828 A1 | 7/2007 | Saadat |
| 2007/0179487 A1 | 8/2007 | Tearney et al. |
| 2007/0185479 A1 | 8/2007 | Lau |
| 2007/0225697 A1 | 9/2007 | Shroff et al. |
| 2007/0270717 A1 | 11/2007 | Tang et al. |
| 2007/0270789 A1 | 11/2007 | Berger |
| 2007/0270792 A1 | 11/2007 | Hennemann et al. |
| 2007/0270795 A1 | 11/2007 | Francischelli et al. |
| 2007/0276259 A1 | 11/2007 | Okawa et al. |
| 2007/0287886 A1 | 12/2007 | Saadat |
| 2007/0293724 A1 | 12/2007 | Saadat et al. |

(56) References Cited

U.S. PATENT DOCUMENTS

| | | |
|---|---|---|
| 2008/0009747 A1 | 1/2008 | Saadat et al. |
| 2008/0015569 A1 | 1/2008 | Saadat et al. |
| 2008/0021275 A1 | 1/2008 | Tearney et al. |
| 2008/0033241 A1 | 2/2008 | Peh et al. |
| 2008/0058650 A1 | 3/2008 | Saadat et al. |
| 2008/0058785 A1 | 3/2008 | Boyden et al. |
| 2008/0058786 A1 | 3/2008 | Boyden et al. |
| 2008/0097476 A1 | 4/2008 | Peh et al. |
| 2008/0101677 A1 | 5/2008 | Mashke et al. |
| 2008/0103355 A1 | 5/2008 | Boyden et al. |
| 2008/0119694 A1 | 5/2008 | Lee |
| 2008/0125634 A1 | 5/2008 | Ryan et al. |
| 2008/0154257 A1 | 6/2008 | Sharareh et al. |
| 2008/0172049 A1 | 7/2008 | Bredno et al. |
| 2008/0183036 A1 | 7/2008 | Saadat et al. |
| 2008/0212867 A1 | 9/2008 | Provenzano et al. |
| 2008/0214889 A1 | 9/2008 | Saadat et al. |
| 2008/0221448 A1 | 9/2008 | Khuri-Yakub et al. |
| 2008/0228032 A1 | 9/2008 | Starksen et al. |
| 2008/0228079 A1 | 9/2008 | Donaldson et al. |
| 2008/0243214 A1 | 10/2008 | Koblish |
| 2008/0275300 A1 | 11/2008 | Rothe et al. |
| 2008/0281293 A1 | 11/2008 | Peh et al. |
| 2008/0300589 A1 | 12/2008 | Paul et al. |
| 2009/0012367 A1 | 1/2009 | Chin et al. |
| 2009/0030276 A1 | 1/2009 | Saadat et al. |
| 2009/0030412 A1 | 1/2009 | Willis et al. |
| 2009/0054803 A1 | 2/2009 | Saadat et al. |
| 2009/0062790 A1 | 3/2009 | Malchano et al. |
| 2009/0076373 A1 | 3/2009 | Maschke |
| 2009/0076375 A1 | 3/2009 | Maschke |
| 2009/0082623 A1 | 3/2009 | Rothe et al. |
| 2009/0082660 A1 | 3/2009 | Rahn et al. |
| 2009/0125022 A1 | 5/2009 | Saadat et al. |
| 2009/0131931 A1 | 5/2009 | Lee et al. |
| 2009/0143640 A1 | 6/2009 | Saadat et al. |
| 2009/0203962 A1 | 8/2009 | Miller et al. |
| 2009/0204069 A1 | 8/2009 | Hirszowicz et al. |
| 2009/0221871 A1 | 9/2009 | Peh et al. |
| 2009/0227999 A1 | 9/2009 | Willis et al. |
| 2009/0253991 A1 | 10/2009 | Balas et al. |
| 2009/0275799 A1 | 11/2009 | Saadat et al. |
| 2009/0281541 A1 | 11/2009 | Ibrahim et al. |
| 2009/0292211 A1 | 11/2009 | Lin et al. |
| 2009/0299354 A1 | 12/2009 | Melsky et al. |
| 2009/0299363 A1 | 12/2009 | Saadat et al. |
| 2009/0306643 A1 | 12/2009 | Pappone et al. |
| 2009/0326385 A1 | 12/2009 | Hendriks et al. |
| 2010/0022832 A1 | 1/2010 | Makiyama |
| 2010/0041986 A1 | 2/2010 | Nguyen et al. |
| 2010/0056966 A1 | 3/2010 | Toth |
| 2010/0081127 A1 | 4/2010 | Maier et al. |
| 2010/0081873 A1 | 4/2010 | Tanimura et al. |
| 2010/0081948 A1 | 4/2010 | Pastore et al. |
| 2010/0084563 A1 | 4/2010 | Ohno |
| 2010/0114094 A1 | 5/2010 | Thapliyal et al. |
| 2010/0130836 A1 | 5/2010 | Malchano et al. |
| 2010/0152728 A1 | 6/2010 | Park et al. |
| 2010/0198065 A1 | 8/2010 | Thapliyal et al. |
| 2010/0204544 A1 | 8/2010 | Takei |
| 2010/0204561 A1 | 8/2010 | Saadat |
| 2010/0228247 A1 | 9/2010 | Paul et al. |
| 2010/0241117 A1 | 9/2010 | Paul et al. |
| 2010/0274364 A1 | 10/2010 | Pacanowsky |
| 2010/0312094 A1 | 12/2010 | Guttman et al. |
| 2010/0312096 A1 | 12/2010 | Guttman et al. |
| 2010/0331838 A1 | 12/2010 | Ibrahim et al. |
| 2011/0009793 A1 | 1/2011 | Lucero |
| 2011/0019893 A1 | 1/2011 | Rahn et al. |
| 2011/0029058 A1 | 2/2011 | Swanson |
| 2011/0042580 A1 | 2/2011 | Wilson et al. |
| 2011/0066147 A1 | 3/2011 | He et al. |
| 2011/0071647 A1 | 3/2011 | Mahon |
| 2011/0082450 A1 | 4/2011 | Melsky et al. |
| 2011/0082451 A1 | 4/2011 | Melsky et al. |
| 2011/0082452 A1 | 4/2011 | Melsky et al. |
| 2011/0117025 A1 | 5/2011 | Dacosta et al. |
| 2011/0144524 A1 | 6/2011 | Fish et al. |
| 2011/0224494 A1 | 9/2011 | Piskun et al. |
| 2011/0230903 A1 | 9/2011 | Bertolero |
| 2011/0275932 A1 | 11/2011 | Leblond et al. |
| 2011/0276046 A1 | 11/2011 | Heimbecher et al. |
| 2011/0282250 A1 | 11/2011 | Fung et al. |
| 2011/0313417 A1 | 12/2011 | De La Rama et al. |
| 2012/0023638 A1 | 2/2012 | Leicester |
| 2012/0029504 A1 | 2/2012 | Afonso et al. |
| 2012/0109031 A1 | 5/2012 | Vollbrecht |
| 2012/0123276 A1 | 5/2012 | Govari et al. |
| 2012/0143177 A1 | 6/2012 | Avitall |
| 2012/0150046 A1 | 6/2012 | Watson et al. |
| 2012/0184812 A1 | 7/2012 | Terakawa |
| 2012/0184813 A1 | 7/2012 | Terakawa |
| 2012/0197243 A1 | 8/2012 | Sherman et al. |
| 2012/0215112 A1 | 8/2012 | Lewis et al. |
| 2012/0220999 A1 | 8/2012 | Long |
| 2012/0259263 A1 | 10/2012 | Celermajer et al. |
| 2012/0323237 A1 | 12/2012 | Paul et al. |
| 2012/0326055 A1 | 12/2012 | Wilson et al. |
| 2013/0006116 A1 | 1/2013 | Kim et al. |
| 2013/0023865 A1 | 1/2013 | Steinke et al. |
| 2013/0030425 A1 | 1/2013 | Stewart et al. |
| 2013/0079645 A1 | 3/2013 | Amirana et al. |
| 2013/0085416 A1 | 4/2013 | Mest |
| 2013/0096593 A1 | 4/2013 | Thapliyal et al. |
| 2013/0096594 A1 | 4/2013 | Thapliyal et al. |
| 2013/0102862 A1 | 4/2013 | Amirana et al. |
| 2013/0107002 A1 | 5/2013 | Kikuchi |
| 2013/0137949 A1 | 5/2013 | Freeman et al. |
| 2013/0150693 A1 | 6/2013 | D'Angelo et al. |
| 2013/0150732 A1 | 6/2013 | Manzke et al. |
| 2013/0158545 A1 | 6/2013 | Govari et al. |
| 2013/0172742 A1 | 7/2013 | Rankin et al. |
| 2013/0172875 A1 | 7/2013 | Govari et al. |
| 2013/0226163 A1 | 8/2013 | Peled et al. |
| 2013/0237841 A1 | 9/2013 | Freeman et al. |
| 2013/0253330 A1 | 9/2013 | Demos |
| 2013/0261455 A1 | 10/2013 | Thapliyal et al. |
| 2013/0267875 A1 | 10/2013 | Thapliyal et al. |
| 2013/0281920 A1 | 10/2013 | Hawkins et al. |
| 2013/0282005 A1 | 10/2013 | Koch et al. |
| 2013/0289358 A1 | 10/2013 | Melsky et al. |
| 2013/0289672 A1 | 10/2013 | Hakomori et al. |
| 2013/0296840 A1 | 11/2013 | Condie et al. |
| 2013/0310680 A1 | 11/2013 | Werahera et al. |
| 2013/0331831 A1 | 12/2013 | Werneth et al. |
| 2014/0031802 A1 | 1/2014 | Melsky |
| 2014/0058244 A1 | 2/2014 | Krocak |
| 2014/0058246 A1 | 2/2014 | Boveja et al. |
| 2014/0081253 A1 | 3/2014 | Kumar et al. |
| 2014/0088418 A1 | 3/2014 | Radulescu et al. |
| 2014/0107430 A1 | 4/2014 | Deno et al. |
| 2014/0121537 A1 | 5/2014 | Aeby et al. |
| 2014/0121660 A1 | 5/2014 | Hauck |
| 2014/0148703 A1 | 5/2014 | Deladi et al. |
| 2014/0163360 A1 | 6/2014 | Stevens-Wright et al. |
| 2014/0163543 A1 | 6/2014 | Allison et al. |
| 2014/0171806 A1 | 6/2014 | Govari et al. |
| 2014/0171936 A1 | 6/2014 | Govari et al. |
| 2014/0180273 A1 | 6/2014 | Nair |
| 2014/0194867 A1 | 7/2014 | Fish et al. |
| 2014/0194869 A1 | 7/2014 | Leo et al. |
| 2014/0243843 A1 | 8/2014 | Havel et al. |
| 2014/0275972 A1 | 9/2014 | George et al. |
| 2014/0276687 A1 | 9/2014 | Goodman et al. |
| 2014/0276771 A1 | 9/2014 | Miller et al. |
| 2014/0316280 A1 | 10/2014 | Mueller et al. |
| 2014/0324085 A1 | 10/2014 | Thapliyal et al. |
| 2014/0350547 A1 | 11/2014 | Sharareh et al. |
| 2014/0357956 A1 | 12/2014 | Salahieh et al. |
| 2014/0378843 A1 | 12/2014 | Valdes et al. |
| 2014/0378846 A1 | 12/2014 | Hosoda et al. |
| 2015/0038824 A1 | 2/2015 | Lupotti |
| 2015/0073245 A1 | 3/2015 | Klimovitch et al. |
| 2015/0099979 A1 | 4/2015 | Caves et al. |

(56) References Cited

U.S. PATENT DOCUMENTS

| | | |
|---|---|---|
| 2015/0141847 A1 | 5/2015 | Sarvazyan et al. |
| 2015/0148630 A1* | 5/2015 | Meester ............ A61B 1/00096 600/317 |
| 2015/0164332 A1 | 6/2015 | Mercader et al. |
| 2015/0182279 A1 | 7/2015 | Ashton et al. |
| 2015/0196202 A1 | 7/2015 | Mercader et al. |
| 2015/0216398 A1 | 8/2015 | Yang et al. |
| 2015/0327753 A1 | 11/2015 | Amirana et al. |
| 2015/0346100 A1 | 12/2015 | Racowsky et al. |
| 2015/0374217 A1 | 12/2015 | Sinofsky |
| 2016/0051321 A1 | 2/2016 | Salahieh et al. |
| 2016/0120599 A1 | 5/2016 | Amirana et al. |
| 2016/0120602 A1 | 5/2016 | Ransbury et al. |
| 2016/0143522 A1 | 5/2016 | Ransbury et al. |
| 2016/0228206 A1 | 8/2016 | Bell et al. |
| 2017/0014202 A1 | 1/2017 | Ransbury et al. |
| 2017/0020394 A1 | 1/2017 | Harrington |
| 2017/0035341 A1 | 2/2017 | Nagale et al. |
| 2017/0135559 A1 | 5/2017 | Horrisberger et al. |
| 2018/0263476 A1 | 9/2018 | Amirana et al. |
| 2019/0053849 A1 | 2/2019 | Ransbury et al. |
| 2019/0254735 A1 | 8/2019 | Stewart et al. |
| 2019/0262056 A1 | 8/2019 | Yang et al. |
| 2019/0350647 A1 | 11/2019 | Ramberg et al. |
| 2020/0008681 A1 | 1/2020 | Sarvazyan |
| 2020/0330727 A1 | 10/2020 | Creighton |
| 2020/0352425 A1 | 11/2020 | Amirana et al. |
| 2020/0352644 A1 | 11/2020 | Ransbury et al. |
| 2020/0352645 A1 | 11/2020 | Amirana et al. |
| 2021/0045834 A1 | 2/2021 | Amirana et al. |
| 2021/0205017 A1 | 7/2021 | Amirana et al. |
| 2021/0369118 A1 | 12/2021 | Sarvazyan |
| 2022/0031377 A1 | 2/2022 | Ransbury et al. |
| 2022/0133172 A1 | 5/2022 | Ransbury et al. |
| 2022/0142482 A1 | 5/2022 | Mercader et al. |
| 2022/0226665 A1 | 7/2022 | Uto |
| 2023/0293000 A1 | 9/2023 | Amirana et al. |
| 2023/0404373 A1 | 12/2023 | Ransbury et al. |
| 2025/0127386 A1 | 4/2025 | Amirana et al. |

FOREIGN PATENT DOCUMENTS

| | | |
|---|---|---|
| CN | 101199410 | 6/2008 |
| CN | 102099671 | 6/2011 |
| CN | 102397104 | 4/2012 |
| CN | 203525125 | 4/2014 |
| CN | 106028914 | 10/2016 |
| DE | 102005021205 | 11/2006 |
| DE | 102011083522 | 3/2013 |
| EP | 2691041 | 2/2014 |
| EP | 2 889 013 | 7/2015 |
| JP | 60182928 | 9/1985 |
| JP | 63-262613 | 10/1988 |
| JP | 10150177 | 6/1998 |
| JP | 2006158546 | 6/2006 |
| JP | 20090148550 A | 7/2009 |
| JP | 2011/212423 | 10/2011 |
| JP | 201252882 A | 3/2012 |
| JP | 20130544551 A | 12/2013 |
| JP | 20150128586 A | 7/2015 |
| JP | 2018158114 A | 10/2018 |
| NL | 2002010 | 10/2009 |
| WO | WO 1997/037622 | 10/1997 |
| WO | WO 1999/013934 | 3/1999 |
| WO | WO 2001/001854 | 1/2001 |
| WO | WO 2001/072214 | 10/2001 |
| WO | WO 2003/092520 | 11/2003 |
| WO | WO 2004/028353 | 4/2004 |
| WO | WO 2006/028824 | 3/2006 |
| WO | 2007041542 A2 | 4/2007 |
| WO | WO 2007/109554 | 9/2007 |
| WO | WO 2007/127228 | 11/2007 |
| WO | WO 2008/028149 | 3/2008 |
| WO | 2008054423 A1 | 5/2008 |
| WO | WO 2008/114748 | 9/2008 |
| WO | WO 2008/154578 | 12/2008 |
| WO | WO 2010/075450 | 7/2010 |
| WO | WO 2011/025640 | 3/2011 |
| WO | WO 2011/113162 | 9/2011 |
| WO | WO 2012038824 | 3/2012 |
| WO | WO 2012/049621 | 4/2012 |
| WO | WO 2012/067682 | 5/2012 |
| WO | 20120131577 A2 | 10/2012 |
| WO | WO 2013/044182 | 3/2013 |
| WO | WO 2013/068885 | 5/2013 |
| WO | WO 2013/116316 | 8/2013 |
| WO | WO 2013/169340 | 11/2013 |
| WO | WO 2014/028770 | 2/2014 |
| WO | 2014205256 A2 | 12/2014 |
| WO | WO 2015/073871 | 5/2015 |
| WO | WO 2015/077474 | 5/2015 |
| WO | WO 2016/073476 | 5/2016 |
| WO | WO 2016/073492 | 5/2016 |
| WO | WO 2016/086160 | 6/2016 |
| WO | WO 2017/015257 | 1/2017 |

OTHER PUBLICATIONS

Anderson et al. "Real-time spectroscopic assessment of thermal damage: implications for radiofrequency ablation". J Gastrointest Surg. 2004; 8: 660-669.

Anderson, J.K., "Time Course of Nicotinamide Adenine Dinucleotide Diaphorase Staining after Renal Radiofrequency Ablation Influences Viability Assessment", Journal of Endourology, vol. 21, Issue 2, Mar. 5, 2007.

Asfour et al, "Signal decomposition of transmembrane voltage-sensitive dye fluorescence using a multiresolution wavelet analysis" IEEE Trans Biomed Eng. 2011; 58: 2083-2093.

Berthier, J.P., et al., "XeCl Laser Action at Medium Fluences on Biological Tissues: Fluorescence Study and Simulation with a Chemical Solution", Journal of Photochemistry and Photobiology B: Biology, vol. 5, Issues 3-4, pp. 495-503, May 1990.

Boersma et al,."Pulmonary vein isolation by duty-cycled bipolar and unipolar radiofrequency energy with a multielectrode ablation catheter". Heart Rhythm5:1635-1642, 2008.

Bogaards et al., In Vivo Quantification of Fluorescent Molecular Markers in Real-Time: A Review to Evaluate the Performance of Five Existing Methods, Photodiagnosis and Photodynamic Therapy, vol. 4: 170-178 (2007).

Bogaards et al., n Vivo Quantification of Fluorescent Molecular Markers in Real-Time by Ratio Imaging for Diagnostic Screening and Image-Guided Surgery, Lasers in Surgery and Medicing vol. 39: 605-613 (2007).

Buch et al. "Epicardial catheter ablation of atrial fibrillation." Minerva Med. 2009; 100: 151-157.

Cancio et al., "Hyperspectral Imaging: A New Approach to the Diagnosis of Hemorrhagic Shock", The Journal of Trauma, 2006, vol. 60, No. 5: 1087-1095.

Chance et al, "Fluorescence measurements of mitochondrial pyridine nucleotide in aerobiosis and anaerobiosis" Nature. 1959; 184: 931-4.

Coremans et al, "Pretransplantation assessment of renal viability with NADH fluorimetry", Kidney International, vol. 57, (2000), pp. 671-683.

D'Avila A. "Epicardial catheter ablation of ventricular tachycardia." Heart Rhythm. 2008; 5: S73-5.

Demos et al, "Real time assessment of RF cardiac tissue ablation with optical spectroscopy", Opt Express. 2008; 16: 15286-15296.

Dickfeld et al, "Characterization of Radiofrequency Ablation Lesions With Gadolinium-Enhanced Cardiovascular Magnetic Resonance Imaging" J Am Coll Cardiol. 2006; 47: 370-378.

Dukkipati et al, "Visual balloon-guided point-by-point ablation: reliable, reproducible, and persistent pulmonary vein isolation", Circ Arrhythm Electrophysiol. 2010; 3: 266-273.

Dumas et al, "Myocardial electrical impedance as a predictor of the quality of RF-induced linear lesions." Physiol Meas. 2008; 29: 1195-1207.

(56) References Cited

OTHER PUBLICATIONS

Dyer, B., et al., Heart, "The Application of Autofluorescence Lifetime Metrology as a Novel Label-free Technique for the Assessment of Cardiac Disease", vol. 11, Issue Supplement 3, pp. 186, Jun. 2014.

Fleming et al, "Real-time monitoring of cardiac redio-frequency ablation lesion formation using an optical coherence tomography forward-imaging catheter", Journal of Biomedical Optics, May/Jun. 2010, vol. 15(3).

Fleming et al, "Toward guidance of epicardial cardiac radiofrequency ablation therapy using optical coherence tomography" J Biomed Opt. 2010; 15: 041510.

Girard et al, "Contrast-enhanced C-arm CT evaluation of radiofrequency ablation lesions in the left ventricle", JACC Cardiovasc Imaging. 2011; 4: 259-268.

Grimard et al, "Percutaneous epicardial radiofrequency ablation of ventricular arrhythmias after failure of endocardial approach: a 9-year experience" J Cardiovasc Electrophysiol. 2010; 21: 56-61.

Henz et al, "Simultaneous epicardial and endocardial substrate mapping and radiofrequency catheter ablation as first-line treatment for ventricular tachycardia and frequent ICD shocks in chronic chagasic cardiomyopathy" J Interv Card Electrophysiol. 2009; 26: 195-205.

Himel et al, "Translesion stimulus-excitation delay indicates quality of linear lesions produced by radiofrequency ablation in rabbit hearts", Physiol Meas. 2007; 28: 611-623.

Kalman, J.M., et al., "Cardiac Magnetic Resonance Imaging to Detect Non-Contiguous Scar Following Atrial Fibrillation Ablation: Identifying our Knowledge Gaps", European Heart Journal, Editorial, pp. 1-3, Feb. 26, 2014.

Kay et al, "Locations of ectopic beats coincide with spatial gradients of NADH in a regional model of low-flow reperfusion", Am J Physiol Heart Circ Physiol. 2008; 294: H2400-5.

Khoury et al., "Localizing and Quantifying Ablation Lesions in the Left Ventricle by Myocardial Contrast Echocardiography", J Cardiovasc Electrophysiol. 2004; 15: 1078-1087.

Kim et al, "Materials for multifunctional balloon catheters with capabilities in cardiac electrophysiological mapping and ablation therapy", Nat Mater. 2011; 10: 316-323.

Kistler, P.M., et al., "The Impact of CT Image Integration into an Electroanatomic Mapping System on Clinical Outcomes of Catheter Ablation of Atrial Fibrillation", Journal of Cardiovascular Electyrophysiology, vol. 17, Issue 10, pp. 1093-1101, Oct. 2006.

Lardo, et al "Visualization and temporal/spatial characterization of cardiac radiofrequency ablation lesions using magnetic resonance imaging", Circulation. 2000; 102: 698-705.

Li, "Multiphoton Microscopy of Live Tissues with Ultraviolet Autofluorescence", IEEE Journal of Selected Topic in Quantam Electronics , May/Jun. 2010, vol. 16, Issue 3, pp. 516-513.

Lo et al, "Three-dimensional electroanatomic mapping systems in catheter ablation of atrial fibrillation", Circ J. 2010; 74: 18-23.

Malchano, Z.J., "Integration of Cardiac CT/MR Imaging with Three-Dimensional Electroanatomical Mapping to Guide Catheter Manipulation in the Left Atrium: Implications for Catheter Ablation of Atrial Fibrillation", Journal of Cardiovascular Electrophysiology, vol. 17, Issue 11, pp. 1221-1229, Nov. 2006.

Mayevsky et al. "Oxidation-reduction states of NADH in vivo: from animals to clinical use", Mitochondrion. 2007; 7: 330-339.

Melby et al, "Atrial fibrillation propagates through gaps in ablation lines: implications for ablative treatment of atrial fibrillation", Heart Rhythm. 2008; 5: 1296-1301.

Menes et al, "Laparoscopy: searching for the proper insufflation gas" Surg Endosc. 2000; 14: 1050-1056.

Meng et al "A comparative study of fibroid ablation rates using radio frequency or high-intensity focused ultrasound", Cardiovasc Intervent Radiol. 2010; 33: 794-799.

Mercader et al, "NADH as an Endogenous Marker of Cardiac Tissue Injury at the Site of Radiofrequency Ablation", The George Washington University, Washington DC, Mar. 18, 2011.

Mercader et al, "Use of endogenous NADH fluorescence for real-time in situ visualization of epicardial radiofrequency ablation lesions and gaps", Am J Physiol Heart Circ Physiol, May 2012; 302(10): H2131-H2138.

Naito, H., et al., "Use of Nadh Fluorescence Imaging for Early Detection of Energy Failure and a Prediction of Infarction", Critical Care Medicine, vol. 39, Issue 12, pp. 40, Dec. 2011.

Nath et al, "Basic aspects of radiofrequency catheter ablation", J Cardiovasc Electrophysiol. 1994; 5: 863-876.

Niu et al, "An acute experimental model demonstrating 2 different forms of sustained atrial tachyarrhythmias". Circ Arrhythm Electrophysiol. 2009; 2: 384-392.

Perez et al. "Effects of gap geometry on conduction through discontinuous radiofrequency lesions" Circulation. 2006; 113: 1723-1729.

Ranji et al, "Fluorescence spectroscopy and imaging of myocardial apoptosis", Journal of Biomedical Optics 11(6), 064036 (Nov./Dec. 2006).

Ranji et al, "Quantifying Acute Myocardial Injury Using Ratiometric Fluorometry", IEEE Trans Biomed Eng. May 2009; 56(5): 1556-1563.

Riess et al, "Altered NADH and improved function by anesthetic and ischemic preconditioning in guinea pig intact hearts", Am J Physiol Heart Circ Physiol 283; H53-H60, Mar. 14, 2002.

Robertson, J.O., "Quantification of the Functional Consequences of Atrial Fibrillation and Surgical Ablation on the Left Atrium Using Cardiac Magnetic Resonance Imaging", European Journal of Cardio-Thoracic Surgery, vol. 46, Issue 4, pp. 720-728, Oct. 1, 2014.

Roger et al, "American Heart Association Stastics Committee and Stroke Subcommittee. Heart disease and stroke statistics—2011 update; a report from American Heart Association", Circulation 2011; 123: e18-e209.

Sethuraman et al., "Spectroscopic Intravascular Photoacoustic Imaging to Differentiate Atherosclerotic Plaques", Optics Express, vol. 16, No. 5, pp. 3362-3367, Mar. 3, 2008.

Smith, S., et al., "Imaging Appearances Following Thermal Ablation", Clinical Radiology, vol. 63, Issue 1, pp. 1-11, Jan. 2008.

Sosa et al, "Epicardial mapping and ablation techniques to control ventricular tachycardia". J Cardiovasc Electrophysiol. 2005; 16: 449-452.

Sra, J., et al., "Computed Tomography-Fluoroscopy Image Integration-Guided Catheter Ablation of Atrial Fibrillation", Journal of Cardiovascular Electrophysiology, vol. 18, Issue 4, pp. 409-414, Apr. 2007.

Swartling et al, "Changes in tissue optical properties due to radiofrequency ablation of myocardium", Med Biol Eng Comput. 2003; 41: 403-409.

Swift et al, "Controlled regional hypoperfusion in Langendorff heart preparations". Physiol Meas. 2008; 29: 269-79.

Swift, L.M., et al., "Properties of Blebbistatin for Cardiac Optical Mapping and Other Imaging Applications", European Journal of Physiology, vol. 464, Issue 5, pp. 503-512, Nov. 2012.

Swift, Luther Mitchell, "Real-Time Visualization of Cardiac Ablation Lesions Using Endogenous NADH Fluorescence and Reflected Light", A dissertation submitted to The Faculty of The Columbian College of Arts and Sciences of The George Washington University in partial fulfillment of the requirements for the degree of Doctor of Philosophy, Jul. 23, 2013.

Van Haesendonck C, Sinnaeve A, Willems R, Vandenbulcke F, Stroobandt R, ."Biophysical and electrical aspects of radiofrequency catheter ablation". Acta Cardiol 50: 105-115, 1995.

Vetterlein et al., "Extent of damage in aschemic, nonreperfused myocardium of anesthetized rats", Am J Physiol Heart Circ Physiol 285: H755-H765, 2003.

Vo-Dinh et al., "A Hyperspectral Imaging System for In Vivo Optical Diagnostics", IEEE Engineering in Medicine and Biology Magazine, pp. 40-49, Sep./Oct. 2004.

Weight, C.J., et al., "Correlation of Radiographic Imaging and Histopathology Following Cryoablation and Radio Frequency Ablation for Renal Tumors", The Journal of Urology, vol. 179, Issue 4, pp. 1277-1283, Apr. 2008.

(56) References Cited

OTHER PUBLICATIONS

Wu, H., et al., "Real-Time Monitoring of Radiofrequency Ablation and Postablation Assessment: Accuracy of Contrast-Enhanced US in Experimental Rat Liver Model", Radiology, vol. 270, No. 1, pp. 107-116, Jan. 2014.
Yokoyama et al, "Novel contact force sensor incorporated in irrigated radiofrequency ablation catheter predicts lesion size and incidence of steam pop and thrombus", Circ Arrhythm Electrophysiol. 2008; 1: 354-362.
Zuzak et al., "Characterization of a Near-Infrared Laparoscopic Hyperspectral Imaging System for Minimally Invasive Surgery", Analytical Chemistry, vol. 79, No. 12, pp. 4709-4715, Jun. 15, 2007.

\* cited by examiner

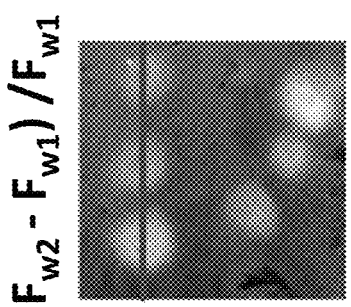
FIG. 4D $(F_{w2} - F_{w1})/F_{w1}$
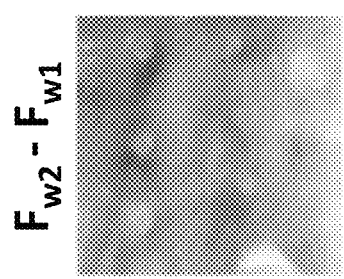
FIG. 4C $F_{w2} - F_{w1}$
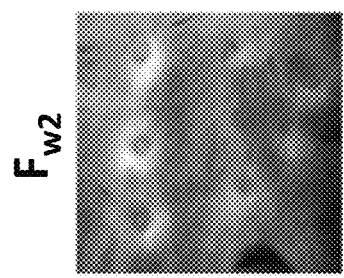
FIG. 4B $F_{w2}$
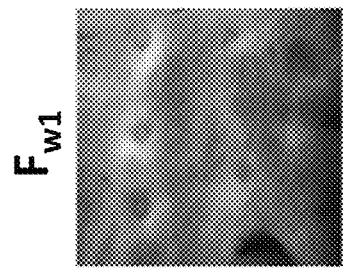
FIG. 4A $F_{w1}$

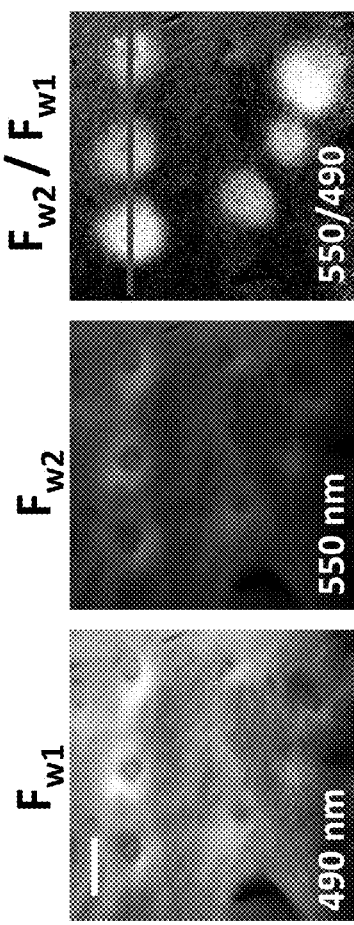

UV light illumination

HSI/unmixed

UV light illumination

HSI/unmixed

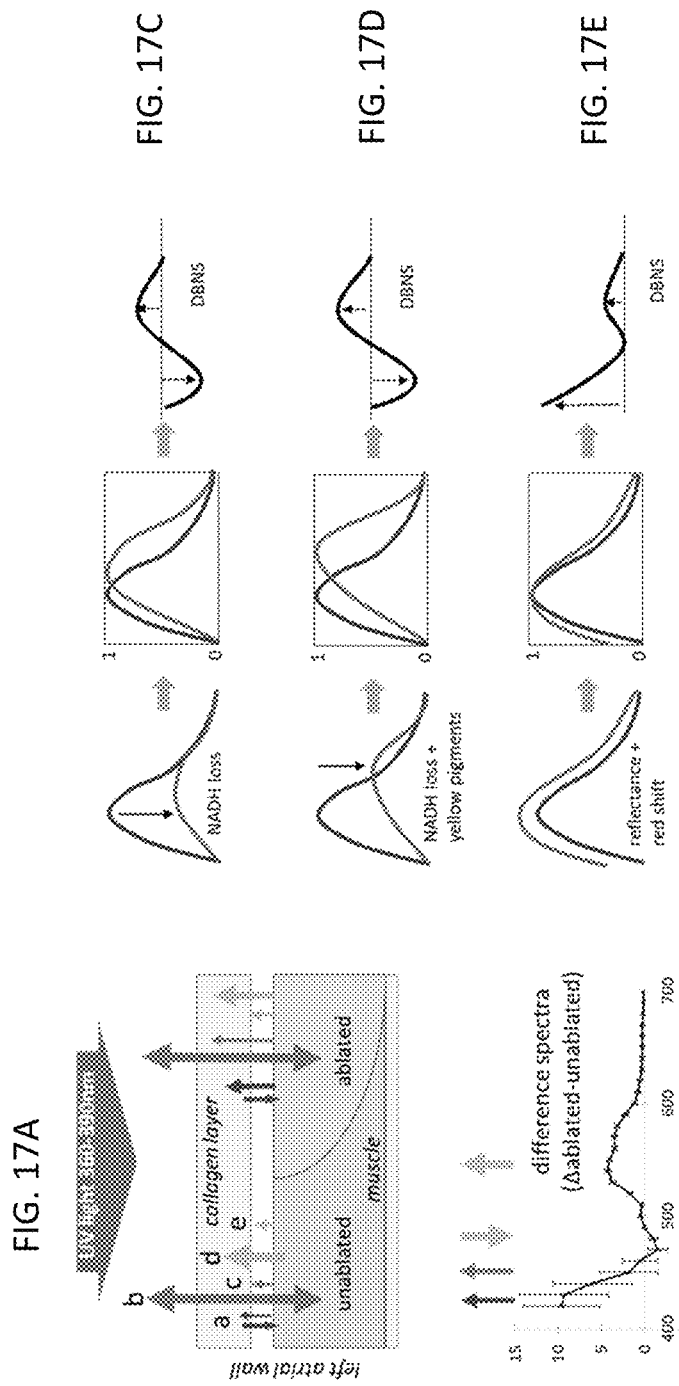

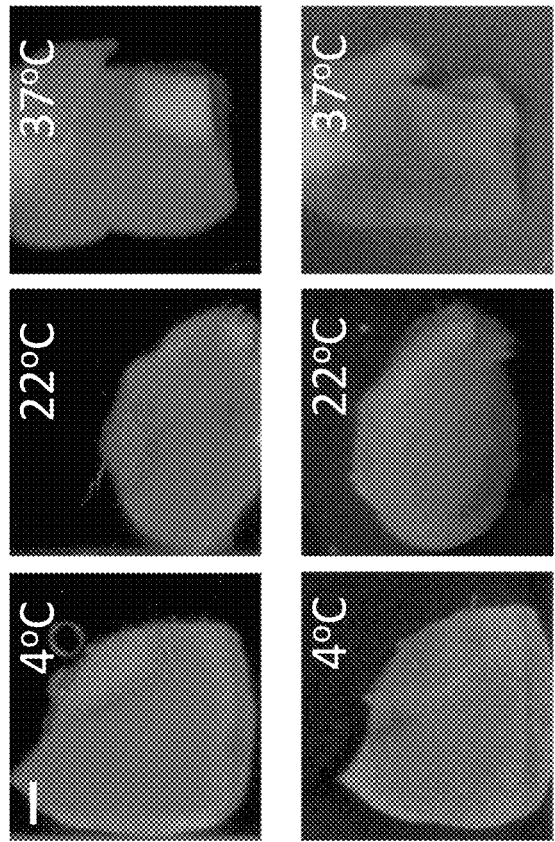
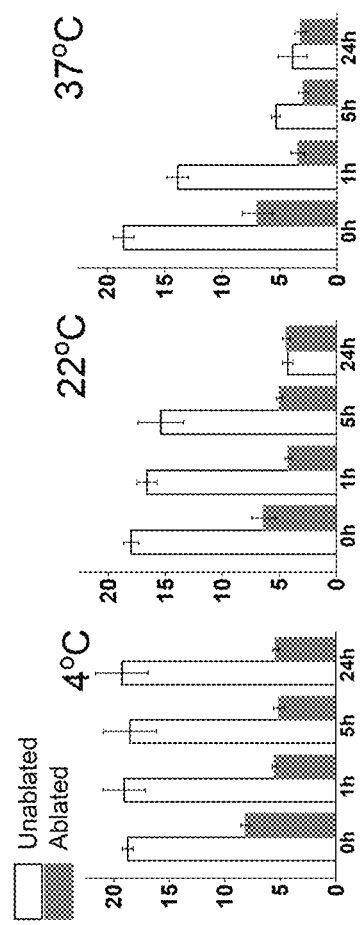
FIG. 18A
FIG. 18B
FIG. 18C
FIG. 18D
FIG. 18E

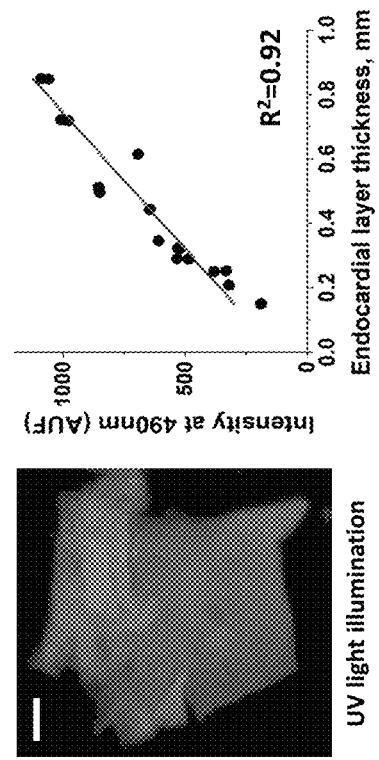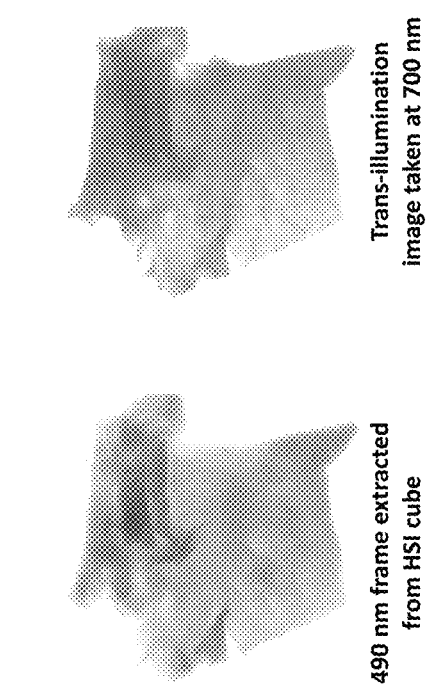
FIG. 21A UV light illumination
FIG. 21B
FIG. 21C 490 nm frame extracted from HSI cube
FIG. 21D Trans-illumination image taken at 700 nm

LESION VISUALIZATION USING DUAL WAVELENGTH APPROACH

RELATED APPLICATIONS

This application claims the benefit of and priority to U.S. Provisional Application Ser. No. 63/572,030, filed on May 27, 2020, which is incorporated herein by reference in its entirety.

GOVERNMENT SUPPORT

This invention was made with government support under National Institutes of Health, NHLBI, R42 HL120511, 38831/1/CCNS91258F. The government has certain rights in the invention.

FIELD

The present disclosure generally relates to ablation and imaging systems and methods to optically interrogate tissue to assess impact of energy delivery to the tissue and to assess quality of contact between a catheter and tissue.

BACKGROUND

Atrial fibrillation (AF) is the most common sustained arrhythmia in the world, which currently affects millions of people. In the United States, AF is projected to affect 10 million people by the year 2050. AF is associated with increased mortality, morbidity, and an impaired quality of life, and is an independent risk factor for stroke. The substantial lifetime risk of developing AF underscores the public health burden of the disease, which in the U.S. alone amounts to an annual treatment cost exceeding $7 billion.

Most episodes in patients with AF are known to be triggered by focal electrical activity originating from within muscle sleeves that extend into the Pulmonary Veins (PV). Atrial fibrillation may also be triggered by focal activity within the superior vena cava or other atrial structures, i.e. other cardiac tissue within the heart's conduction system. These focal triggers can also cause atrial tachycardia that is driven by reentrant electrical activity (or rotors), which may then fragment into a multitude of electrical wavelets that are characteristic of atrial fibrillation. Furthermore, prolonged AF can cause functional alterations in cardiac cell membranes and these changes further perpetuate atrial fibrillation.

Ablation systems are used by physicians to treat atrial fibrillation. Physicians use a catheter to direct energy to either destroy focal triggers or to form electrical isolation lines isolating the triggers from the heart's remaining tissue and conduction system. The latter technique is commonly used in what is called pulmonary vein isolation (PVI). However, the success rate of the AF ablation procedure has remained relatively stagnant with estimates of recurrence to be as high as 30% to 50% one-year post procedure. The most common reason for recurrence after catheter ablation is one or more gaps in the PVI lines. The gaps are usually the result of missed areas or ineffective or incomplete lesions that may temporarily block electrical signals during the procedure but heal over time and facilitate the recurrence of atrial fibrillation.

Ineffective or incomplete lesions are often the result of poor catheter contact with the myocardium. With poor contact the transfer of energy from the catheter to the myocardium is inefficient and often insufficient to cause a proper lesion. Intermittent contact can also be unsafe.

Therefore, there is a need for system and method for forming and verifying ablation lesions to improve outcomes and reduce costs.

SUMMARY

The present disclosure provides systems and methods for performing and monitoring tissue ablation. In particular, the present disclosure provides systems and methods for optical tissue interrogation (for example, imaging) to reveal ablations, during or after tissue modification.

In some aspects, the present disclosure provides a system for interrogating tissue comprising a light source providing ultraviolet light for illuminating a tissue region comprising one or more lesions from ablation and a sensor being configured to receive light to detect autofluorescence from the illuminated tissue region. The sensor can detect light at one or more first wavelengths in a first wavelength range such that the first wavelength range includes a peak intensity of autofluorescence from the illuminated tissue region and detecting light at one or more second wavelengths in a second wavelength range such that the second wavelength range is 20 nm to 100 nm longer than the first wavelength range. A processor is programmed to generate at least one first digital representation of the tissue region from light detected in the first wavelength range and at least one second digital representation of the tissue region from light detected in the second wavelength range, and generate a final digital representation from the at least one first digital representation and the at least one second digital representation. The final digital representation distinguishes between ablated and non-ablated tissue.

In some embodiments, the system can include an ablation device having an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy.

In some embodiments, the processor is further programed to subtract the at least one first digital representation from the at least one second digital representation and to divide a resulting digital representation by the first digital representation to generate the final digital representation of the illuminated tissue region to distinguish between ablated tissue and non-ablated tissue. In some embodiments the processor is further configured to divide the at least one second digital representation by the at least one first digital representation to generate the final digital representation of the illuminated tissue region to distinguish between ablated tissue and non-ablated tissue. In some embodiments, the processor is further programmed to optimize a contrast and brightness of the final digital representation of the illuminated tissue to distinguish between ablated tissue and non-ablated tissue. In some embodiments, the processor is further programmed to display the final digital representation in pseudo colors, as a 3-D mesh, or a graphical representation.

In some embodiments, the first wavelength range is from about 460 nm to about 510 nm. In some embodiments, the second wavelength range is from about 530 nm to about 600 nm. In some embodiments, the light source is between about 300 nm and about 400 nm. In some embodiments, the sensor is configured to convert an optical image into an electronic signal.

In some embodiments, the system can include an elongated body having a distal end and a proximal end. An ablation device can be disposed at the distal end of the elongated body for ablating the tissue. One or more optical fibers can be configured to extend through the elongated body to deliver the light from the light source to the tissue and to deliver fluorescence to the sensor. An inflatable balloon can be disposed about the distal end of the elongated body.

In some aspects, a method for interrogating tissue is provided and can include illuminating with ultraviolet light from a light source a tissue region including tissue treated by ablation and surrounding tissue to excite the area of tissue, detecting with a sensor the area of tissue to detect light in a first wavelength range such that the first wavelength range includes a peak intensity of autofluorescence from the illuminated tissue region and in a second wavelength range such that the second wavelength range is 20 nm to 100 nm longer than the first wavelength range, and producing a final digital representation of the illuminated tissue illustrating ablated tissue as having different color or gray scale pixel intensity than non-ablated tissue.

In some embodiments, producing the representation includes subtracting a first digital representation associated with the first wavelength range from a second digital representation associated with the second wavelength range and dividing a resulting digital representation by the first digital representation to generate the final digital representation of the illuminated tissue region to distinguish between ablated tissue and non-ablated tissue. In some embodiments, producing the representation includes dividing the second image by the first image to generate a final digital representation of the illuminated tissue region to distinguish between ablated tissue and non-ablated tissue. In some embodiments, optimizing a contrast and brightness of the final digital representation of the illuminated tissue to distinguish between ablated tissue and non-ablated tissue. In some embodiments, the final digital representation is in the form of one of a pseudo color image, a 3-D mesh, and a graphical representation.

In some embodiments, the first wavelength range is from about 460 nm to about 510 nm. In some embodiments, the second wavelength range is from about 530 nm to about 600 nm. In some embodiments, the light source is between about 300 nm and about 400 nm. In some embodiments, the sensor is configured to convert an optical image into an electronic signal.

In some embodiments, the can further comprises advancing to a tissue an elongated body having a distal end and a proximal end, and inflating an inflatable balloon disposed about the distal end of the elongate body to displace fluid around the tissue. In some embodiments, the method can further comprise ablating the tissue with an ablation device, wherein the ablation device has an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy.

A system for interrogating tissue can be provided that includes an endovascular catheter having a distal end and a proximal end, an ablation device disposed at the distal end of the endovascular catheter for ablating tissue, an inflatable balloon disposed about the distal end of the catheter, and a light source providing light between about 300 nm and about 400 nm for illuminating a tissue outside the balloon to excite the tissue. A sensor can be configured to receive light between about 460 nm and about 600 nm to detect fluorescence from the illuminated tissue, and the sensor can detect light at a first wavelength in a first wavelength range from about 470 nm to about 510 nm and detecting light at a second wavelength in a second wavelength range from about 530 nm to about 600 nm. A processor can be associated with the sensor and configured to generate a digital representation of the illuminated tissue to distinguish between ablated tissue and non-ablated tissue.

In some embodiments, the processor is further programed to subtract a first digital representation associated with the first wavelength from a second digital representation associated with the second wavelength and to divide a resulting digital representation by the first digital representation to generate the digital representation of the illuminated tissue to distinguish between ablated tissue and non-ablated tissue. In some embodiments, the processor is further configured to divide a second digital representation associated with the second wavelength by a first digital representation associated with the first wavelength to generate the digital representation of the illuminated tissue to distinguish between ablated tissue and non-ablated tissue. In some embodiments, the processor is further programmed to optimize a contrast and brightness of the digital representation of the illuminated tissue to distinguish between ablated tissue and non-ablated tissue. In some embodiments, the processor is further programmed to display the digital representation in pseudo colors, as a 3-D mesh, or a graphical representation.

In some embodiments, the light source is a UV light emitting diode (LED). In some embodiments, the sensor is configured to convert an optical image into an electronic signal. In some embodiments, the system further includes an inflatable balloon disposed about the distal end of the catheter. In some embodiments, the ablation device has an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy.

A system for interrogating tissue can be provided that includes an ablation device for ablating tissue, a light source providing light between about 300 nm and about 400 nm for illuminating a tissue to excite the tissue, and a sensor being configured to receive light between about 460 nm and about 600 nm to detect fluorescence from the illuminated tissue. The sensor can detect light at a first wavelength in a first wavelength range from about 460 nm to about 510 nm and detecting light at a second wavelength in a second wavelength range from about 530 nm to about 600 nm. A processor is associated with the sensor and is configured to generate a digital representation of the illuminated tissue to distinguish between ablated tissue and non-ablated tissue.

In some embodiments, the processor is further programed to subtract a first digital representation associated with the first wavelength from a second digital representation associated with the second wavelength and to divide a resulting digital representation by the first digital representation to generate the digital representation of the illuminated tissue to distinguish between ablated tissue and non-ablated tissue. In some embodiments, the processor is further configured to divide a second image associated with the second wavelength by a first image associated with the first wavelength to generate the digital representation of the illuminated tissue to distinguish between ablated tissue and non-ablated tissue. In some embodiments, the processor is further programmed to optimize a contrast and brightness of the digital representation of the illuminated tissue to distinguish between ablated tissue and non-ablated tissue. In some embodiments, the processor is further programmed to display the digital representation in pseudo colors, as a 3-D mesh, or a graphical representation.

In some embodiments, the light source is a UV light emitting diode (LED). In some embodiments, the sensor is configured to convert an optical image into an electronic signal. In some embodiments, the ablation device having an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy. The ablation device can be disposed at a distal end of an endovascular catheter for ablating the tissue. In some embodiments, the system can further include an inflatable balloon disposed about the distal end of the catheter.

A method for interrogating tissue can be provided that includes advancing to a tissue an elongated body having a distal end and a proximal end, ablating the tissue with an ablation device disposed at the distal end of the elongated body, illuminating with light between about 300 nm and about 400 nm from a light source an area of tissue including tissue treated by ablation and surrounding tissue to excite the area of tissue, detecting with a sensor the area of tissue to detect light in a first wavelength range between about 460 nm and about 510 nm and to detect light in a second wavelength range between about 530 nm and about 600 nm to detect fluorescence of the area of tissue, and producing a representation of the illuminated tissue, a display illustrating ablated tissue as having different color or gray scale pixel intensity than non-ablated tissue.

In some embodiments, producing the representation includes subtracting a first digital representation associated with the first wavelength range from a second digital representation associated with the second wavelength range and dividing a resulting digital representation by the first digital representation to generate the representation of the illuminated tissue to distinguish between ablated tissue and non-ablated tissue. In some embodiments, producing the representation includes dividing the second image by the first image to generate a final digital representation of the illuminated tissue to distinguish between ablated tissue and non-ablated tissue. In some embodiments, the method can include optimizing a contrast and brightness of the representation of the illuminated tissue to distinguish between ablated tissue and non-ablated tissue. In some embodiments, the representation is in the form of one of a pseudo color image, a 3-D mesh, and a graphical representation.

In some embodiments, the light source is a UV light emitting diode (LED). In some embodiments, the sensor is configured to convert an optical image into an electronic signal. In some embodiments, the method can include inflating an inflatable balloon disposed about the distal end of the elongate body to displace fluid around the tissue. In some embodiments, the ablation device has an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIGS. 4A and 4B are exemplary images taken from an ablated left atrial tissue of a pig with six lesions using a 365 nm light source, with a first wavelength at 490 nm and a second wavelength at 550 nm;

FIG. 4C is an exemplary embodiment of a difference image;

FIG. 4D is an exemplary embodiment of a normalized difference image;

FIGS. 6A and 6B are exemplary images taken from an ablated tissue;

FIG. 6C is an exemplary embodiment of a ratio image;

FIGS. 17A-17E show the main contributors to the spectra of ablated and unablated atrial surface;

FIGS. 18A-18E show the decline of cardiac muscle NADH during storage;

FIGS. 21A, 21B, 21C, and 21D show the correlation between collagen layer thickness and its autofluorescence;

Figure 1:
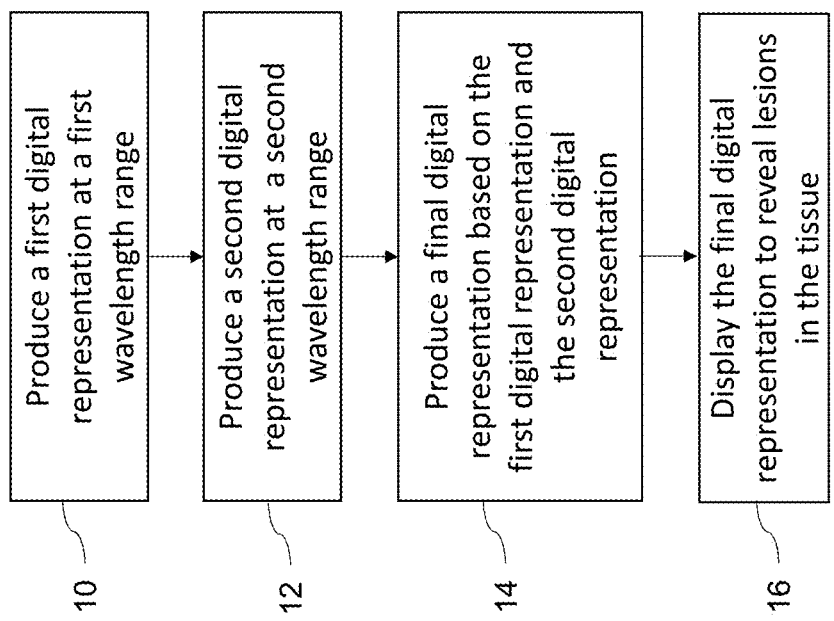
FIG. 1 illustrates an exemplary flowchart of a methods for visualizing regions of ablated tissue.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure provides methods and systems for lesion assessment. In some embodiments, the lesions are formed using ablation energy. In some embodiments, the system of the present disclosure includes a catheter configured to serve two functions: a therapeutic function of delivering ablation therapy (for example, radiofrequency or pulsed field ablation) to a target tissue and a diagnostic function of gathering a signature spectrum from a point of contact of the catheter and tissue to access lesions. In some embodiments, the systems and methods of the present disclosure may be employed for optical tissue interrogation to collect information relating to the tissue using optical means, for example imaging tissue using autofluorescence of the tissue, but other means of optical tissue interrogation can also be used. For example, this can be based on the composition of the tissue, such as collagen, or fluorophores, such as a reduced form of nicotinamide adenine dinucleotide (NADH). In some embodiments, the system may include a catheter or probe with an ablation device and an optical system for exchanging light between tissue and the catheter. In some embodiments, the instant systems allow for direct optical tissue interrogation of the tissue induced by ultraviolet (UV) excitation. The autofluorescence signature detected from the tissue can be used to visualize lesions caused by the ablation energy.

The method is relevant to a growing number of multilayered clinical targets to which spectral approaches are being applied. It is possible that the systems and methods of the present disclosure can be applied to any parts of the heart, including epicardial and endocardial surfaces of the right and left atria, endocardial and epicardial surfaces of the ventricles, as well as major vessels and valve structures. Further, it is possible that the systems and methods of the present disclosure can be applied to identify different tissues and sites of ablation that are performed on various organs and parts of the human body, including, but not to limited to any multi-layer tissue, uterine lining (endometrial ablation) or cancer within several organs of the body, including the liver, kidneys, lungs, muscle or bone. In some embodiments, by examining the key variables that can influence ablation-induced spectral changes, including the change in fluorescence levels, a dual wavelength algorithm can be generated that can be used to acquire and post-process the spectral information required to reveal the lesion sites.

A method for viewing and tracking ablation lesion is provided and involves 1) an algorithm to select two specific wavelength ranges for the images of the tissue at a site of interest to be acquired, 2) obtaining digital representations of the tissue site in the two wavelength ranges, and 3) a mathematical operation to be applied to these two digital representations of the tissue site. The result shows ablation lesions in muscle tissue with variable thickness of collagen on its surface. This approach can be used for imaging and/or point-sensing catheters that reveal ablation lesions of surfaces of the heart. It can be also applicable to other tissues with multilayered structures. The instant systems and methods can produce a digital representation of ablation of a tissue site, ablation progress, or can visualize pre-existing ablation lesions at a site of interest. The digital representation of the lesion site can have many forms, including but not limited to a grayscale image, a pseudocolor image, a three-dimensional representation such as a 3D mesh, and a graphical representation, as will be discussed in more detail below. The ultimate benefit is an improvement in surgical procedures to terminate cardiac arrhythmias, including atrial fibrillation.

FIG. 1 is a flowchart of an exemplary embodiment for viewing and/or tracking tissue ablation. In step 10, a first digital representation of a tissue region is produced at a first wavelength in a first wavelength range. In step 12, a second digital representation of a tissue region is produced at a second wavelength in a second wavelength range. In step 14, a final digital representation is produced based on the first digital representation and the second digital representation, and the final digital representation can be displayed to reveal lesions in the tissue region. The final digital representation can have a variety of forms, including but not limited to a grayscale image, a pseudocolor image, a three-dimensional mesh image, and a graphical representation.

Figure 2A:
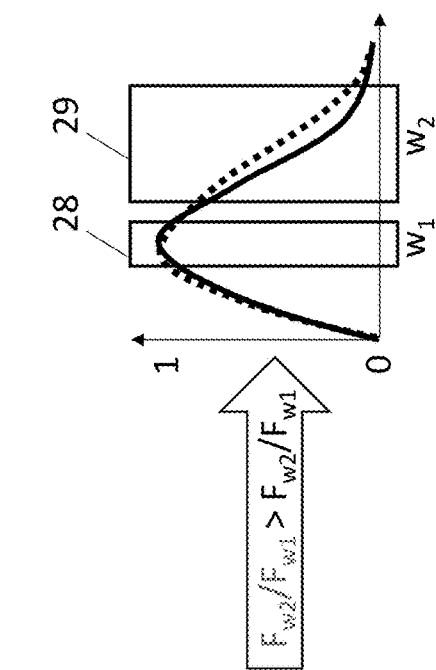
FIGS. 2A, 2B, and 2C illustrate exemplary graphs of wavelength versus intensity relating to the selection of first and second wavelength ranges.
Figure 2B:
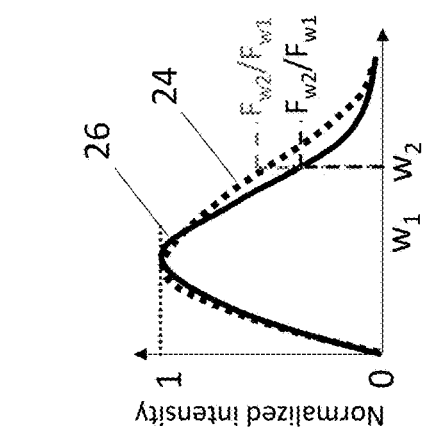

Multi-layer tissue can be illuminated, and a peak wavelength can be found based on a primary fluorophore. In some embodiments, the primary fluorophore found in tissue can be collagen. The first wavelength range can be centered around the peak of autofluorescence. In some embodiments, the peak wavelength can be used as the first wavelength range by using the peak wavelength, ±50 nm, ±40 nm, ±30 nm, or ±20 nm, in some embodiments. Thus, the first wavelength is the wavelength at which the maximum intensity of autofluorescence is detected when the tissue illuminated by UV light. FIG. 2A depicts an exemplary graph of wavelength versus raw autofluorescence intensity of a representative pixel from ablated tissue (line 20) and unablated tissue (line 22). When normalized to the peak fluorescence value found at wavelength W1, the right shoulder (i.e., the slope of the curve that is right of the peak) for pixels from ablated area (line 24) is higher than that of the unablated tissue (line 26), as shown in FIG. 2B. Thus, as the curves of FIG. 2B are normalized using peak fluorescence, the curves are normalized to the amount of fluorophore, for example collagen, in the tissue. By finding the difference or the ratio between the normalized autofluorescence values from wavelength ranges shown by gray rectangles W1 and W2 in FIG. 2C, the ablated tissue can be revealed. The range for W1 (box 28) is centered around the peak autofluorescence, and the range for W2 (box 29) relates to the area in the right shoulder of the curves in which there is a difference between the two normalized curves. In some embodiments, W2 can be between 20 nm and 100 nm longer than W1.

Figure 2C:
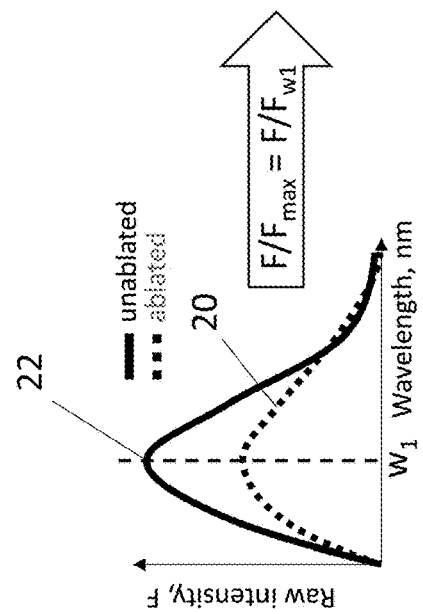

When the raw autofluorescence profiles of each pixel of the image are normalized, as shown in FIG. 2B, the right shoulder of the normalized spectra was consistency higher for ablated regions of the tissue. Therefore, by finding a ratio between the intensity at longer wavelengths (20 nm-100 nm from the peak to get the second wavelength) and the peak autofluorescence intensity (for example, in the 460-510 nm range, which is the first wavelength) yields a value that is proportional to the degree of surface damage caused by ablation ($F_{w2}/F_{w1}$). When such values are plotted for all the pixels of the image, it yields a gray scale image of the surface with lesions being clearly visible. This is because the $F_{w2}/F_{w1}$ ratio is higher for the ablated tissue as compared to unablated one. The first wavelength range and the second wavelength range can be further adjusted based on patient age, BMI and other known variables. The bandwidths centered at the first wavelength and the second wavelength can be made more narrow or wide based on the properties of the specific optical system used to acquire images. In some embodiments, the principle for selecting the wavelength ranges is shown in FIGS. 2A-2C. The reason for not collecting photons at wavelengths further from the peak is that the intensity of autofluorescence progressively declines at longer wavelengths, thus collecting light at much longer wavelengths will yield noisy, low intensity signals.

The first and second wavelength ranges can vary. It will be understood that the first wavelength range can be centered around the fluorescence peak of the primary fluorophore in the tissue, which in some tissue can be collagen. Thus, the center of the first wavelength range can vary based on the tissue's primary or predominant fluorophore. For example, the range for the first wavelength can be 470 nm to 510 nm, 480 nm to 520 nm, 480 nm to 530 nm, or 490 nm to 540 nm. It will also be understood that the first wavelength range can include the fluorescence peak of the primary fluorophore but not be centered around that peak. For example, as fluorescence peak of collagen as the primary fluorophore is 490 nm, the first wavelength range can be 460 nm to 510 nm.

It will be understood that the second wavelength range can vary depending the slope of the right shoulder of the intensity curves as long as the range for the second wavelength includes the area of the curve where the ablated tissue's intensity curve is higher than the unablated tissue's intensity curve. For example, the maximum range for the second wavelength can be along the right shoulder of the curves at a minimum and maximum point along the curves where the ablated and unablated intensity curves cross each other.

For example, in some embodiments, the first wavelength can be 490 nm and the second wavelength can be 550 nm. In some embodiments, the first wavelength is 490 nm and the second wavelength can be 530 nm. In some embodiments, a first wavelength can be between about 470 nm and about 510 nm and a second wavelength can be between about 530 nm and about 600 nm. In some embodiments, a first wavelength can be between 490 nm and 510 nm and a second wavelength can be between about 530 nm and about 600 nm.

In some embodiments, in addition to images in the first and second wavelength ranges, additional digital representations can be taken at wavelengths other than the first and second wavelengths. These additional digital representations can be included in the numerical operations to further increase the fidelity of the final digital representation.

Figure 3:
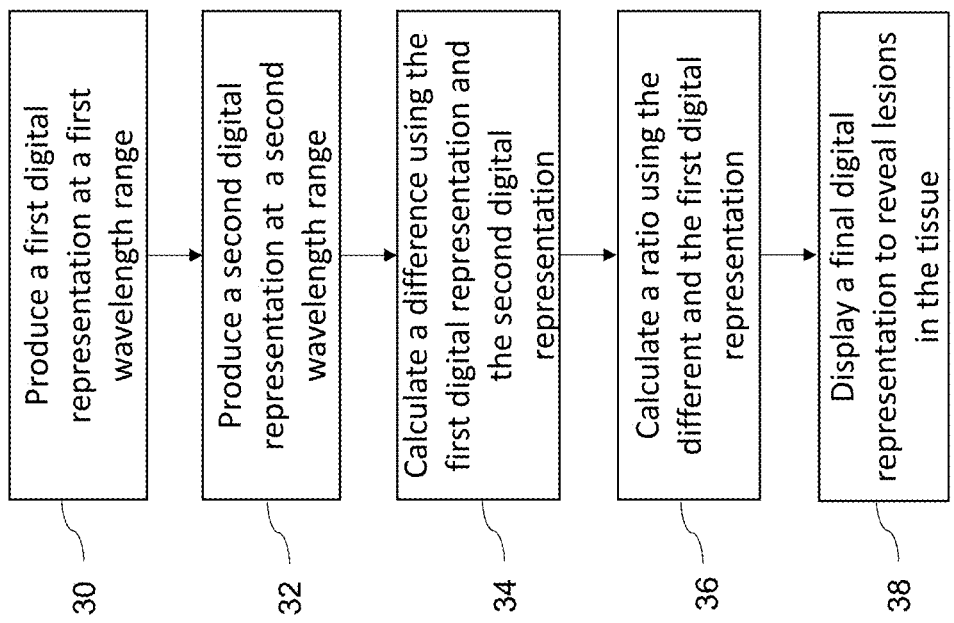
FIG. 3 illustrates an exemplary flowchart of a method for creating a digital representation of ablation of a tissue region.

FIG. 3 presents an exemplary embodiment of the instant methods. In step 30, a first digital representation, for example an image, of a tissue region is produced at a first wavelength range. In some embodiments, the first wavelength range is determined based on the maximum autofluorescence intensity of collagen layer illuminated by the specified source of ultraviolet light. For example, the first wavelength range can be ±20 nm from the peak, ±30 nm from the peak, ±40 nm from the peak, or ±50 nm from the peak. This step yields a digital representation, for example a grayscale image, of tissue at the first wavelength, as shown in FIG. 4A. In some embodiments, the first wavelength range is from 460 nm to 510 nm, for example, based on a peak fluorescence of collagen of about 490 nm.

In step 32, a second digital representation, for example an image, of the tissue region at a second wavelength range is produced. The second wavelength range includes wavelengths that are 20-100 nm longer than the first. It yields a digital representation, for example an image, at the second wavelength, as shown in FIG. 4B. In some embodiments, the second wavelength range is from 530 nm to 600 nm. In some embodiments, the first image taken at the first wavelength and the second image taken at the second wavelength can be obtained simultaneously or sequentially. Simultaneous acquisition on the same camera sensor can be performed using optical splitters, dichroic mirrors or similar optical devices, as will be described in more detail below.

In some embodiments, a final digital representation in the form of a grayscale image can be produced that is generated using a difference image (the second image minus the first image) in step 34 as shown in FIG. 4C, divided by the first image to receive a final image in the form of a normalized difference image (step 36), as shown in FIG. 4D, that reveals the lesions. In step 38, the final digital representation can be displayed to reveal tissue lesions. In some embodiments, the normalized difference image can be the final digital representation. Each pixel of a gray scale image has a numerical value so any mathematical operation can be applied to this value to form a new image based on the calculated numbers for each pixel. Thus, by finding the difference between the normalized pixel values of autofluorescence intensity at the first and second wavelength, the lesions can be revealed. This is because such mathematical operation shows the elevation of the right shoulder of the normalized autofluorescence spectra.

Figure 5:
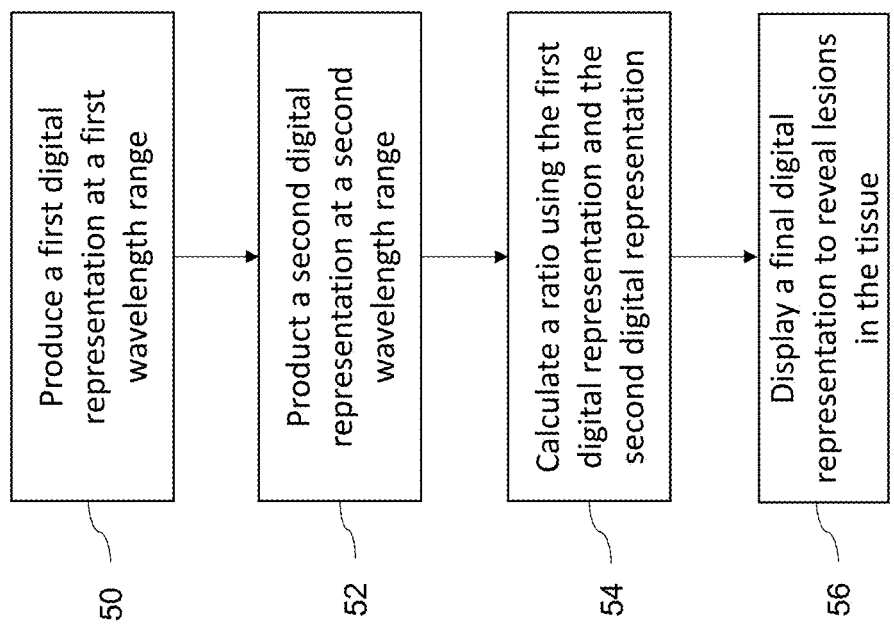
FIG. 5 illustrates an exemplary flowchart of a method for creating a digital representation of ablation of a tissue region.

FIG. 5 presents another exemplary embodiment of the instant methods. Similar to the method shown in FIG. 3, in step 50 and step 52, first and second digital representations of a tissue region are produced at first and second wavelength ranges, as shown in FIGS. 6A and 6B. A ratio image that represented the ratio between the image taken at second wavelength and the first wavelength is produced (step 54), as shown in FIG. 6C.

In some embodiments, contrast and brightness of the final image is adjusted to the new grayscale. In some embodiments, pseudocolors are used to create a final digital representation of the lesions and lesion gaps between the lesions (inter-lesion gap) in the tissue site in the form of a pseudocolor image for better visual display of the lesions, as shown in FIG. 7A. In some embodiments, the final digital representation can be in the form of a 3D mesh image showing the lesion locations, the lesion depths, and lesion gaps, as shown in FIG. 7B.

Figure 7C:
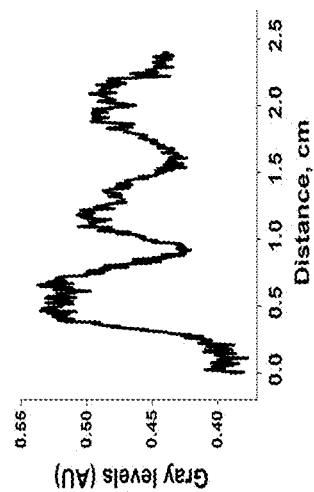
FIG. 7C is an exemplary embodiment of a graphical representation of the gaps between ablation lesions.
Figure 7B:
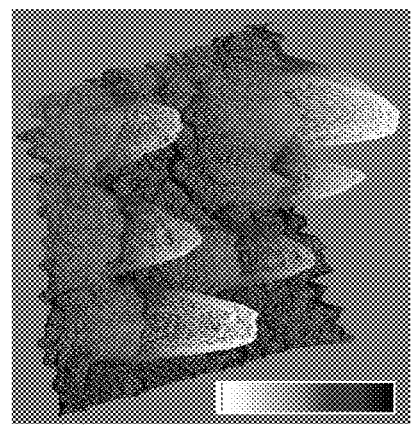
FIG. 7B is an exemplary embodiment of a 3D mesh image.
Figure 7A:
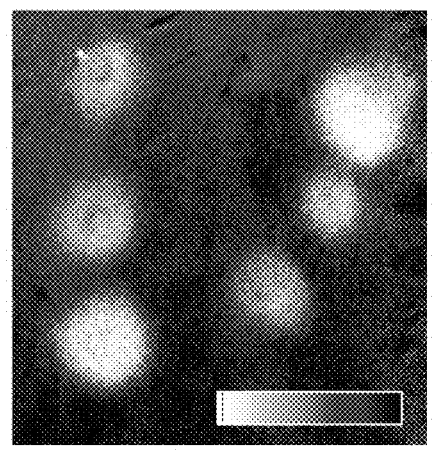
FIG. 7A is an exemplary embodiment of a pseudocolor image.

In some embodiments, the final digital representation can be a graphical representation of the lesions formed in the tissue, as shown in FIG. 7C, which shows intensity profiles across three lesions shown in FIG. 4D and FIG. 6C (represented by the line across the images). The intensity profile shows the values of the pixels across top three lesions. As shown, the graphical representation illustrates that the lesion on the left of the images is stronger than the one on the right of the images as well more clearly show the gaps between the lesions.

Thus, it is possible to use just two wavelength ranges to reveal the lesions. In some embodiments, more than two digital representations or images can be used such that each of the first and second digital representations can be a composite or an average of multiple digital representations (for example, images) taken within the two wavelength ranges. In some embodiments, multiple digital representations can be taken at multiple wavelengths within the first wavelength range and/or the second wavelength range, and the multiple digital representations can be averaged before performing the steps of creating the final digital representation. In some embodiments, multiple digital representations can be taken at a single wavelength within the first wavelength range and/or the second wavelength range, and those images can be averaged before performing the steps of creating the final digital representation.

Overall System

Figure 8:
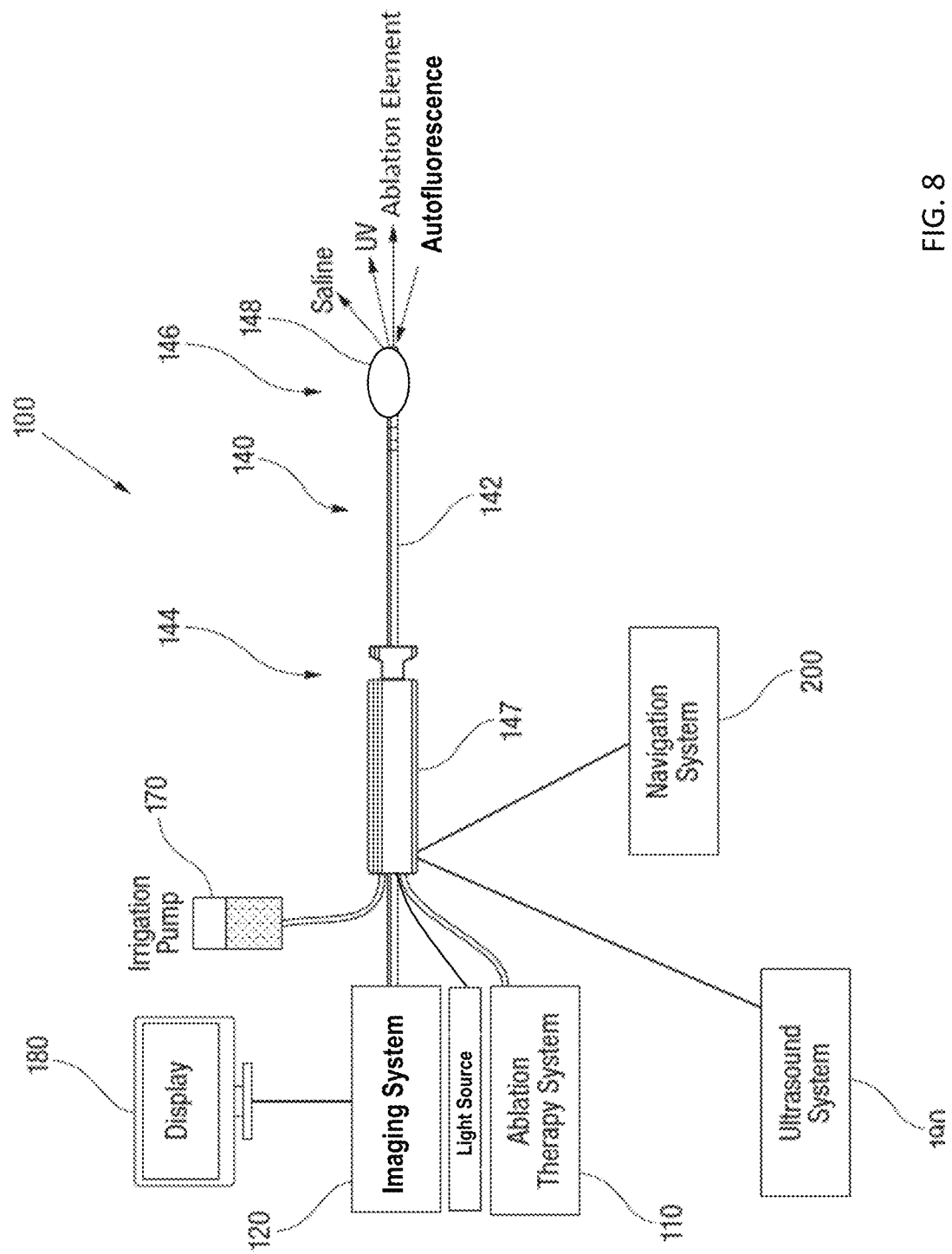
FIG. 8 illustrates an exemplary embodiment of an ablation system.

In reference to FIG. 8, the system 100 for providing ablation therapy may include an ablation therapy system 110, an imaging system 120, and a catheter 140. In some embodiments, the system 100 may also include one or more of an irrigation system 170, ultrasound system 190 and a navigation system 200. The system may also include a display 180, which can be a separate display or a part of the imaging system 120, as described below. In some embodiments, the system includes an ablation generator, an irrigation pump 170, an irrigated-tip ablation catheter 140, and the imaging system 120.

In some embodiments, the ablation therapy system 110 is designed to supply ablation energy to the catheter 140. One or more types of ablation energy can include one or more energy sources that can generate radiofrequency (RF) energy, microwave energy, electrical energy, electromagnetic energy, cryoenergy, laser energy, ultrasound energy, acoustic energy, chemical energy, thermal energy, electroporation energy, pulsed field ablation or any other type of energy can be used to ablate tissue. In some embodiments, the ablation energy can be selected from one or more types of thermal ablation.

In some embodiments, the system 100 of the present disclosure may further include an ultrasound system 190. The catheter 140 may be equipped with ultrasound transducers in communication with the ultrasound system 190. In some embodiments, the ultrasound may show tissue depth, which in combination with the metabolic activity or the depth of lesion may be used to determine if a lesion is in fact transmural or not. In some embodiments, the ultrasound transducers may be located in the distal section of the catheter 140, and optionally in the tip of the distal electrode. The ultrasonic transducers may be configured to assess a tissue thickness either below or adjacent to the catheter tip. In some embodiments, the catheter 140 may comprise multiple transducers adapted to provide depth information covering a situation where the catheter tip is relatively perpendicular to a myocardium or relatively parallel to a myocardium.

Referring to FIG. 8, as noted above, the system 100 may also include an irrigation system 170. In some embodiments, the irrigation system 170 pumps saline into the catheter 140 to cool the tip electrode during ablation therapy. This may help to prevent thrombi, steam pops and char formation. In some embodiments, the irrigation fluid is maintained at a positive pressure relative to pressure outside of the catheter 140 for continuous flushing of the one or more openings 154 as shown in FIG. 10B.

The system 100 may, in some embodiments, also include a navigation system 200 for locating and navigating the catheter 140. In some embodiments, the catheter 140 may include one or more electromagnetic location sensors in communication with the navigation system 200. In some embodiments, the electromagnetic location sensors may be used to locate the tip of the catheter in the navigation system 200. The sensor picks up electromagnetic energy from a source location and computes location through triangulation or other means. In some embodiments, the catheter 140 comprises more than one transducer adapted to render a position of the catheter body 142 and a curvature of the catheter body on a navigation system display. In some embodiments, the navigation system 200 may include one or more magnets and alterations in the magnetic field produced by the magnets on the electromagnetic sensors that can deflect the tip of catheters to the desired direction. Other navigation systems may also be employed, including manual navigation.

Optical Interrogation System

Figure 9A:
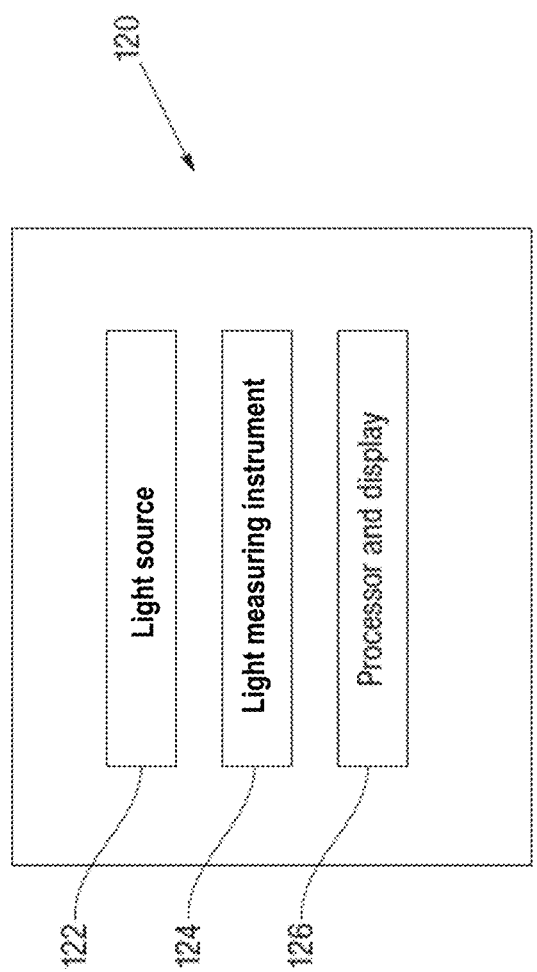
FIG. 9A is a diagram of an embodiment of an imaging system for use in connection with an imaging and monitoring system of the present disclosure.

In reference to FIG. 9A, the optical interrogation or imaging system 120 may include a light source 122, a light measuring instrument 124, and a computer system 126. In some embodiments, the light source 122 generates light that excites endogenous fluorophores that autofluoresce at wavelengths between 460 nm and 600 nm. In some embodiments, light sources with wavelengths within 350 nm-400 nm range can be used. In some embodiments, a narrow-band 355 nm source may be used. The output power of the light source 122 may be high enough to produce a recoverable tissue fluorescence signature, yet not so high as to induce cellular damage. The light source 122 may be coupled to an optical fiber to deliver light to and from the catheter 140, as will be described below.

In some embodiments, the systems of the present disclosure may utilize various devices as the light measuring instrument 124, including but not limited to a camera such as a CCD camera, a hyperspectral camera, a multispectral camera, and a spectrometer. The optical fiber can deliver the gathered light to the light measuring instrument 124. The computer system 126 acquires the information from the light measuring instrument 124 and displays it to the physician. In some embodiments, a single camera equipped with an optical splitter and appropriate bandpass filters to simultaneously capture both the first and second images. In some embodiments, the bandpass filters can be used to collect multiple wavelengths in either the first or second wavelength range simultaneously.

Figure 9B:
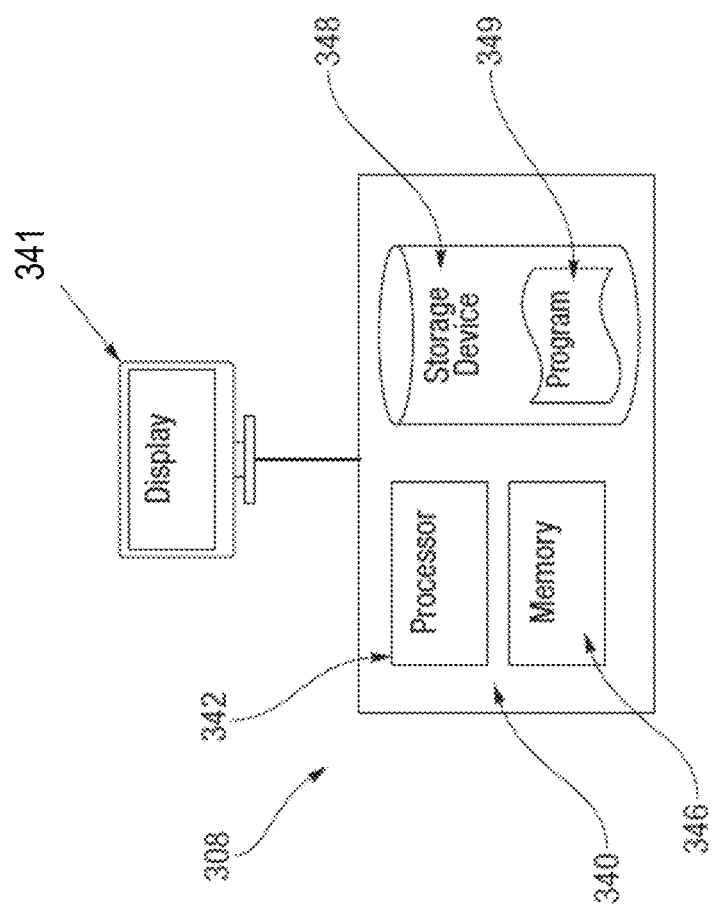
FIG. 9B illustrates an exemplary computer system suitable for use in connection with the systems and methods of the present disclosure.

The computer system 126 can be programed to control various modules of the system 100, including, for example, control over the light source 122, control over the light measuring instrument 124, execution of application specific software, control over ultrasound, navigation and irrigation systems and similar operations. FIG. 9B shows, by way of example, a diagram of a typical processing architecture 308, which may be used in connection with the methods and systems of the present disclosure. A computer processing device 340 can be coupled to display 341 for graphical output. Processor 342 can be a computer processor 342 capable of executing software. Typical examples can be computer processors (such as Intel® or AMD® processors), ASICs, microprocessors, and the like. Processor 342 can be coupled to memory 346, which can be typically a volatile RAM memory for storing instructions and data while processor 342 executes. Processor 342 may also be coupled to storage device 348, which can be a non-volatile storage medium, such as a hard drive, FLASH drive, tape drive, DVDROM, or similar device. Although not shown, computer processing device 340 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 340. Processor 342 may also be coupled to other types of computer-readable media, including, but not limited to, an electronic, optical, magnetic, or other storage or transmission device capable of providing a processor, such as the processor 342, with computer-readable instructions. Various other forms of computer-readable media can transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Program 349 can be a computer program or computer readable code containing instructions and/or data, and can be stored on storage device 348. The instructions may comprise code from any computer-programming language, including, for example, C, C++, C#, Visual Basic, Java, Python, Perl, and JavaScript. In a typical scenario, processor 342 may load some or all of the instructions and/or data of program 349 into memory 346 for execution. Program 349 can be any computer program or process including, but not limited to web browser, browser application, address registration process, application, or any other computer application or process. Program 349 may include various instructions and subroutines, which, when loaded into memory 346 and executed by processor 342 cause processor 342 to perform various operations, some or all of which may effectuate the methods for managing medical care disclosed herein. The program 349 may be stored on any type of non-transitory computer readable medium, such as, without limitation, hard drive, removable drive, CD, DVD or any other type of computer-readable media.

In some embodiments, the computer system may be programmed to perform the steps of the methods of the present disclosure and control various parts of the instant systems to perform necessary operation to achieve the methods of the present disclosure. In some embodiments, the processor may be programed to receive fluorescence data from a tissue illuminated with UV light through the distal tip of the catheter, wherein the tissue is illuminated in a radial direction, an axial direction, or both; to determine from a level of fluorescence in the illuminated tissue when the distal tip of the catheter is in contact with the tissue; and to cause (either automatically or by prompting the user) delivery of ablation energy to the tissue to form a lesion in the tissue upon determining that the distal tip is in contact with the tissue.

The processor may further be programmed for monitoring the level of fluorescence during the delivering ablation energy to confirm that the distal tip remains in contact with the tissue. In some embodiments, monitoring the level of fluorescence during the delivery of ablation energy may be utilized to determine stability of contact between the distal tip and the tissue. In some embodiments, ablation of the tissue may be stopped when the contact between the distal tip and the tissue is not stable. In some embodiments, the processor may further be programmed to collect a spectrum of fluorescence light returned from the illuminated tissue to distinguish tissue type.

In some embodiments, a level of the returned light having a wavelength between about 450 nm and 470 nm is monitored. In some embodiments, the monitored spectrum may be between 420 nm and 500 nm. In some embodiments, the monitored spectrum may be between 400 nm and 520 nm. Additionally or alternatively, a wider spectrum may be monitored, such as, by way of a non-limiting example, between 375 nm and 650 nm. In some embodiments, the fluorescence spectrum and a wider spectrum may be displayed to user simultaneously. In some embodiments, the procedure may be started (by the processor or by prompting the user by the processor) when a fluorescence peak is detected so it can be monitored throughout the procedure. As noted above, the processor may perform these methods in combination with other diagnostic methods, such as ultrasound monitoring.

System: Catheter

In some embodiments, the catheter can be a percutaneous imaging catheter. In some embodiments, the catheter may be a balloon catheter. In some embodiments, the catheter may be designed for endovascular approach. In some embodiments, the catheter may be configured for access to lung (via the trachea), kidney (via urethra), uterus and ovaries (via the cervix and fallopian tubes), etc. In some embodiments, the catheter refers to any device or probe that can be used to administer light from an external light source to tissue. In some embodiments, the catheter can refer to any elongated device with one or more lumens for optical fibers. In some embodiments, such device may be a handheld probe.

The catheter can include an illumination component or device and an imaging component or device. In some embodiments, the catheter 140 may also include an ablation element. For example, the catheter can be based on a standard ablation catheter with accommodations for the optical fibers for illumination and light detection, as discussed above and for example, use saline infusion to clear optically dense blood in front of the fiberoptic sensor. In some embodiments, the catheter 140 is a steerable, irrigated ablation catheter that can be delivered through a sheath to the endocardial space via a standard transseptal procedure and common access tools. On the handle of the catheter, there may be connections for the standard ablation generator and irrigation system 170 for therapy.

Referring back to FIG. 8, the catheter 140 includes a catheter body 142 having a proximal end 144 and a distal end 146. The catheter body 142 may be made of a biocompatible material and may be sufficiently flexible to enable steering and advancement of the catheter 140 to a site of ablation. In some embodiments, the catheter body 142 may have zones of variable stiffness. For example, the stiffness of the catheter 140 may increase from the proximal end 144 toward the distal end 146. In some embodiments, the stiffness of the catheter body 142 is selected to enable delivery of the catheter 140 to a desired cardiac location. In some embodiments, the catheter 140 can be a steerable, ablation catheter that can be delivered through a sheath to the endocardial space, and in the case of the heart's left side, via a standard transseptal procedure using common access tools. The catheter 140 may include a handle at the proximal end 144. The handle may be in communication with one or more lumens of the catheter to allow passage of instruments or materials through the catheter 140. In some embodiments, the handle may include connections for the standard generator and irrigation system 170 for therapy. In some embodiments, the catheter 140 may also include one more adaptors configured to accommodate the optical fiber for illumination and spectroscopy.

Figure 10A:
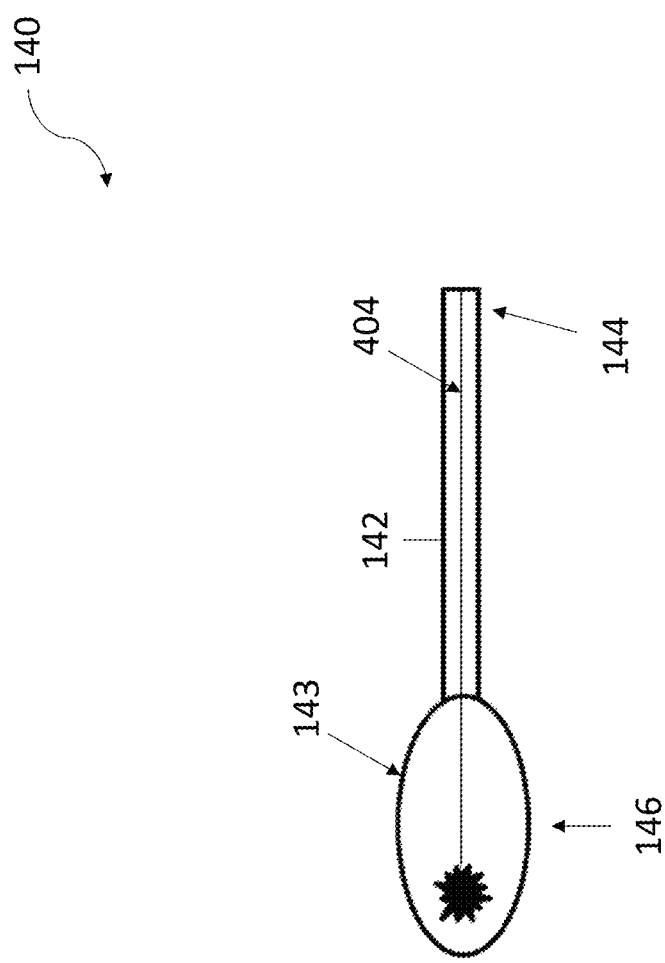
FIGS. 10A, 10B, 10C, and 10D illustrate exemplary embodiments of catheters.

In some embodiments, the catheter 140 may include an optional balloon 143, as shown in FIG. 10A. The balloon 143 may be made of a UV transparent material, such as, for example, a UV transparent fluoropolymer. The balloon 143 may be round, flat, cylindrical, oval, rectangular or another shape depending on the anatomy to be treated using the catheter. In operation, the balloon may be inflated to displace blood at the site of fluorescence imaging in order to afford an optically uncluttered view. Abundance of hemoglobin in the blood leads to the absorption of photons in the visible range, which precludes autofluorescence-based imaging through this medium. The balloon may be inflated with a gas or a liquid.

In some embodiments, the ablation element on the distal tip 146 can be coupled to the ablation energy source (external to the catheter), for example by wires or another lumen that can transfer ablation energy, which can be passed through a lumen of the catheter. The distal tip 148 may have a balloon as is described below. The distal tip 148 may include a port in communication with the one or more lumens of the catheter. The distal tip 148 can be made of any biocompatible material. In some embodiments, if the distal tip 148 is configured to act as an electrode, the distal tip 148 can be made of metal, including, but not limited to, platinum, platinum-iridium, stainless steel, titanium or similar materials.

In reference to FIGS. 10A-10D, a distal end of an exemplary catheter (that may or may not include a balloon at the distal end) is shown that includes an imaging bundle 150 that may be passed from the imaging system 120 of FIG. 8, through the catheter body 142 such that each optical fiber 152 can pass to each electrode in the array. This illumination light is either returned or causes the tissue to fluoresce. The light returned by and fluoresced from the tissue may be gathered by the optical fiber 150 within the distal tip 148 and carried back to the imaging system 120. In some embodiments, the same optical fiber or bundle of fibers 150 may be used to both direct light to the illumination chamber of the distal tip to illuminate tissue outside the catheter 140 and to collect light from the tissue.

In reference to FIGS. 10A-10D, in some embodiments, the catheter may have an imaging lumen 161 through which the optical fiber 150 may be advanced through the catheter body 142. The optical fiber 150 may be advanced through the imaging lumen 161 to illuminate the tissue and receive returned light through the opening 154. As necessary, the optical fiber 150 may be advanced through the opening 154.

Figure 10C:
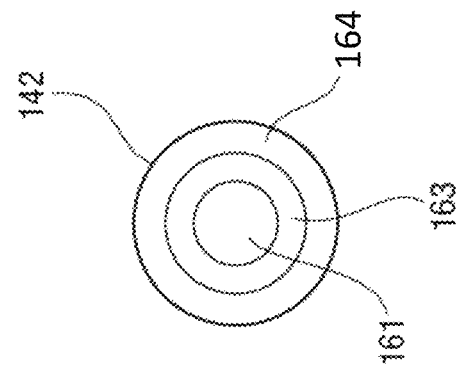
Figure 10B:
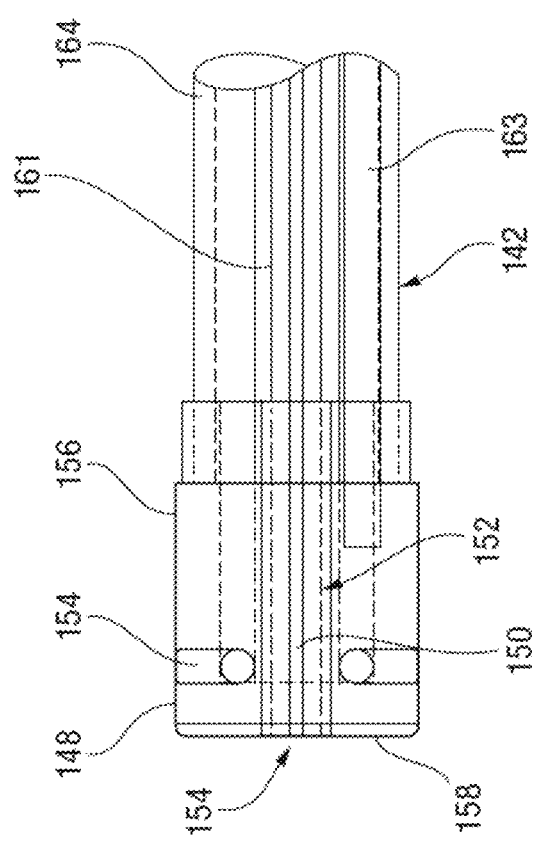

In addition to the optical tissue interrogation lumen 161, the catheter 140 may further include an irrigation lumen 163 for passing irrigation fluid from the irrigation system 170 to the openings 154 (irrigation ports) in the distal tip 148 and an ablation lumen 164 for passing ablation energy from the ablation therapy system 110 to the distal tip 148, such as, for example, by passing a wire through the ablation lumen 164 for ablation energy. It should be noted that the lumens of the catheter may be used for multiple purposes and more than one lumen may be used for the same purpose. In addition, while FIG. 10B and FIG. 10C show the lumens being concentric other configurations of lumens may be employed.

Figure 10D:
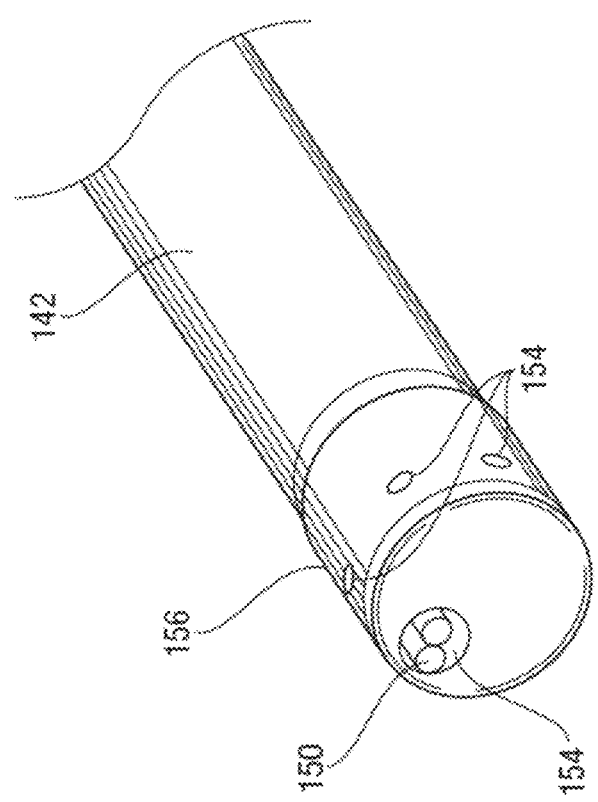

As shown in FIGS. 10A-10D, in some embodiments, a central lumen of the catheter may be utilized as the optical tissue interrogation lumen 161. In some embodiments, as shown in FIG. 10D, the imaging lumen 161 may be off set in relation to the central access of the catheter 140.

In some embodiments, an ablation catheter can be used in combination with a sheath that includes the optical fibers such that the optical fibers associated with the sheath can be positioned relative to the catheter to allow the fibers to be associated with the electrodes. In some embodiments, the sheath can be in the form of a deflectable and/or steerable sheath such that a distal end of the sheath and the optical components associated with the sheath can be positioned at a desired location relative to tissue for ablation.

In some embodiments, the light may also be directed axially and radially with respect to the catheter. In this manner, the light energy exchange between the catheter and tissue may occur over multiple paths, axially, radially or both with respect to the longitudinal central axis of the catheter. This is useful when the anatomy will not allow the catheter tip to be orthogonal to the target site. It may also be useful when increased illumination is required. In some embodiments, additional optical fibers 150 may be used and may be deflected in the radial direction with respect to the catheter 140 to allow the illumination and returned light to exit and enter along the length of the catheter.

Methods of Use

Figure 11:
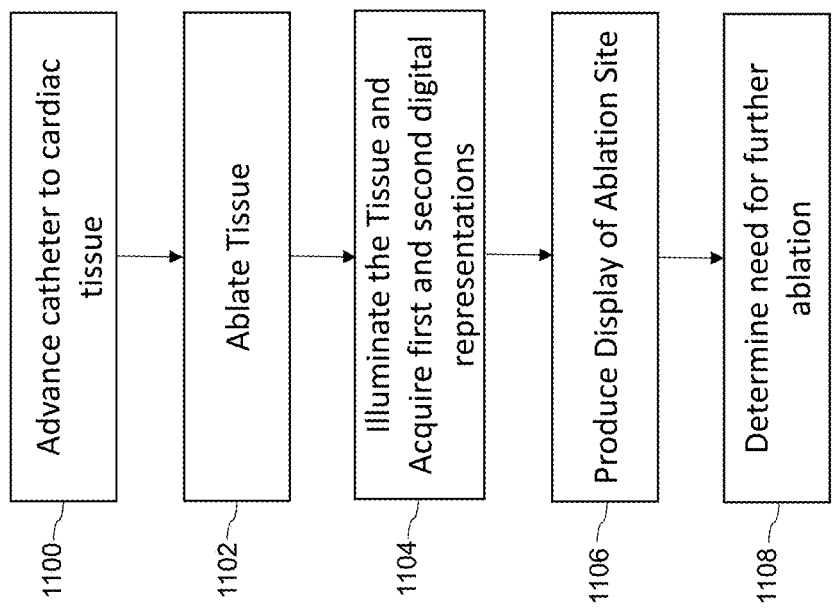
FIG. 11 illustrates a flowchart of a method for interrogating, monitoring, and ablating tissue.

FIG. 11 is a flow chart of a method of using a system of the present disclosure. In reference to FIG. 11, operation of the system 100 of the present disclosure is illustrated. Initially, the catheter 140 is inserted into the area of heart tissue to be ablated, such as the pulmonary vein/left atrial junction or another area of the heart (step 1100). In some embodiments, the catheter 140 may be advanced through the pulmonary vein and pressed against the heart tissue. Blood may be removed from the visual field, for example, by irrigation or balloon. In some embodiments, the tissue may be optionally ablated in step 1102. In step 1104, the ablation site is illuminated. Tissue ablation and illumination can be done simultaneously with a single instrument, or with two different instruments such that the tissue is ablated (step 1102) and then illuminated (step 1104).

Next, in step 1106, a display of the ablation site is produced. Such image may be produced by the method described above in connection with FIG. 3. Once the methods described above are performed, the user may be presented with a graphical representation of the ablation site, which can reveal the ablation lesions. The graphical representation may in a form of a photographic image, graph, signal, chart or any other representations that can assist the user in identifying the lesions or determining whether there is a need for further ablation, in step 1108. In some embodiments, the system can store such pre-ablation and post-ablation signals and optical information for the purpose of documenting the extent of energy delivery to the tissue in a given location. In some embodiments, such data in real time or post-ablation from signals stored can be analyzed via an algorithm to assess or predict the probability of the creation of a durable lesion.

The following examples are put forth to provide those of ordinary skill in the art with a complete disclosure and description of how to make and use the assay, screening, and therapeutic methods of the present disclosure, and are not intended to limit the scope of what the inventors regard as their invention.

EXAMPLES

Radiofrequency ablation is a commonly used clinical procedure that destroys arrhythmogenic sources in patients suffering from atrial fibrillation and other types of cardiac arrhythmias. To improve the success of this procedure, new approaches for real-time visualization of ablation sites are being developed. One of these promising methods is hyperspectral imaging, an approach that detects lesions based on changes in the endogenous tissue autofluorescence profile. To facilitate the clinical implementation of this approach, the key variables that can influence ablation-induced spectral changes, including the drop in myocardial NADH levels, the release of lipofuscin-like pigments, and the increase in diffuse reflectance of the cardiac muscle beneath the endocardial layer have been examined (Muselimyan, Narine, Huda Asfour, and Narine Sarvazyan. "Key factors behind autofluorescence changes caused by ablation of cardiac tissue." Scientific Reports 10.1 (2020): 1-15). Insights from these experiments suggested simpler algorithms that can be used to acquire and post-process the spectral information required to reveal the lesion sites. The suggested approach is relevant to a growing number of multilayered clinical targets to which spectral approaches are being applied.

Percutaneous catheter ablation is currently the mainstream procedure used to terminate atrial fibrillation, as well as many ventricular and nodal rhythm disturbances. It is a highly effective and widely accepted clinical treatment that irreversibly ablates the culprit tissue using either cryofreezing, radiofrequency (RF), or laser energy. Yet even with all of the successes that it has achieved, percutaneous catheter ablation has its shortcomings, one being its inability to visualize damaged tissue in real time. The existing means for monitoring local electrical activity, while effective, cannot substitute for direct observation of ablation lesions and the gaps between them. This is because the specific cause of electrical isolation during AF ablation procedures is not clear. It may result from tissue necrosis, diminished excitability of reversibly injured cells, or from temporary edema. When and if edema subsides or reversible injured cells recover, the electrical conduction between the pulmonary veins and the left atrium (LA) can be restored. Indeed, despite an initial return to sinus rhythm after RF therapy, AF has a high degree of recurrence. Use of spectral imaging allows one to confirm that the loss of electrical conduction is indeed due to irreversible loss of viable cardiomyocytes. In addition, autofluorescence based imaging is a much better tool to reveal small gaps between the lesions since its spatial resolution is on the order of microns, while electrode-based sensing is limited to the millimeter scale. Standard endoscopic cameras are not well suited for in vivo visualizations of ablation-induced damage to the heart muscle due to the presence of the endocardial lining that covers all four cardiac chambers. The main component of the endocardial lining layer is a highly autofluorescent and reflective collagen that obscures spectral changes caused by RF energy to the muscle beneath. The thicker the endocardium, the less observable the ablation lesions. This is particularly true for the left atrium, where the thickness of the endocardium is the highest among the four chambers of the heart. Moreover, it so happens that the left atrium is where the vast majority of culprits responsible for the most common cardiac arrythmia originate.

The use of autofluorescence-based hyperspectral imaging (Auf-HSI) enables the circumvention of limitations imposed by the endocardial collagen layer (Gil, D. A., Swift, L. M., Asfour, H., Muselimyan, N., Mercader, M. A., & Sarvazyan, N. A. (2017). Autofluorescence hyperspectral imaging of radiofrequency ablation lesions in porcine cardiac tissue. Journal of biophotonics, 10(8), 1008-1017). This approach employs illumination of the tissue surface with ultraviolet (UV) light while acquiring grayscale images across multiple wavelengths within the visible range. This creates a three-dimensional dataset, where x and y are the two spatial dimensions, while wavelength λ stands for the third dimension. Autofluorescence spectra are extracted from each $x_i, y_i$ pixel. Then, various mathematical algorithms are used to sort the pixels based on subtle differences in their normalized spectral profiles. Thereafter, the individual pixels are assigned custom pseudocolors to distinguish the ablated from the uninjured tissue.

Auf-HSI can reveal ablation lesions made in the left atrium of large mammals, including pigs, sheep, and cows, as well as in donated human heart tissue (Muselimyan, N., Swift, L. M., Asfour, H., Chahbazian, T., Mazhari, R., Mercader, M. A., & Sarvazyan, N. A. (2016). Seeing the invisible: revealing atrial ablation lesions using hyperspectral imaging approach. PloS one, 11(12), e0167760). The dimensions and the shape of the lesions delineated by Auf-HSI were in perfect agreement with the conventional post-ablation staining methods such as TTC. These promising bench findings justify incorporation of Auf-HSI technology into a percutaneous imaging catheter. The design of this catheter includes a saline-filled balloon to displace optically dense blood from the endocardial surface. It also includes insertable fiber optic bundles to deliver UV light and to collect the emitted visible spectra. An alternative approach is to integrate multiple single-point optical sensors directly into the tip of existing ablation catheters. In the latter case, the autofluorescence profiles from individual points can be obtained by simply touching the tissue without the need for an inflatable balloon to create an optical window.

Physical factors behind spectral changes can be examined in cardiac tissue autofluorescence profiles caused by RF ablation. Equipped with such knowledge, one can then identify specific wavelength ranges where ablation-induced changes are the most pronounced and consistent, allowing to simplification of both acquisition and post-processing algorithms. Insights can be applied not only to the heart, but also to other multilayered body tissues where spectral imaging offers diagnostic promise, including the skin and endovascular or epithelial surfaces.

MATERIALS AND METHODS

Tissue sources and ablation procedures. To fully cover the range of endocardial layer thickness reported in human subjects, experiments were performed using freshly excised hearts from three different species. These included rat ventricles, where the endocardial thickness is negligible, and ending with market-age cows, where the endocardial layer in the left atrium can reach one millimeter in thickness. To test the effects of storage conditions on NADH and other muscle fluorophores, fresh rat ventricles were used, which enabled data acquisition immediately after the excision of the tissue. Bovine and porcine hearts were obtained from a local abattoir or after surgical training at the Washington Institute of Surgical Education & Research. Different aspects of human atrial anatomy had similarities to either porcine or bovine samples. For example, wall thickness is similar to values from market-aged pigs, while endocardial layer thickness is similar to that of a cow. The explanted hearts were transported to the laboratory on ice within a 2-3 h window after the excision, followed by dissection to expose the relevant surfaces to be ablated. RF energy was delivered with a non-irrigated ablation catheter (EP Technologies, Boston Scientific, Marlborough, MA). The 4 mm ablation tip was placed perpendicular to the endocardial surface, with ablation durations varying from 5 to 30 sec and tip temperatures ranging between 50 to 70° C. These settings created lesions similar in size to those placed during clinical RF ablation therapy, as detailed previously.

All animal protocols were approved by the George Washington University Institutional Animal Care and Use Committee. Experiments were performed in accordance with the United States Association for Assessment and Accreditation of Laboratory Animal Care guidelines and regulations.

Imaging hardware. The LED source (Precision LED Spotlight from Mightex, Pleasanton, CA—either 365 nm UV or 5500K cool white) was placed ~5 cm away from the tissue surface and positioned to reduce specular reflection. Hyperspectral datasets were acquired using a commercial HSI system (Nuance FX, PerkinElmer/Cri, Waltham, MA) fitted with Nikon AF Micro-Nikkor 60 mm f/2.8 D lens. The Nuance FX system comprises a liquid crystal tunable filter (CRi LCTF) and a monochromatic charged coupled device (Sony ICX285 CCD). The Nuance FX system can capture wavelengths between 420-720 nm with a spatial resolution of 1392×1040 pixels. For the trans-illumination experiments, a large piece of bovine endocardium was dissected from the underlying muscle tissue and placed on top of a flat-surfaced LED lightbox. Transmission images were acquired at 700 nm using the Nuance FX optical density mode settings. The thickness values were derived from the optical density numbers and calibrated using direct caliper measurements, as described earlier.

Post-processing of hyperspectral imaging datasets. The Nuance FX software package was used to perform supervised linear unmixing, with green and red pseudocolors assigned to ablated and unablated tissues, respectively. A typical signal processing protocol involved the extraction of spectra from regions of interest from the unablated and ablated tissues, followed by spectra normalization from 0 to 1 and then finding the difference between them. This difference was then corrected for the spectral sensitivity of the CCD and CRi LCTF of the Nuance FX system to facilitate compatibility of our conclusions to other acquisition systems.

Statistical analysis. Student's t-test was used to evaluate statistical significance. Values are presented as mean±standard error of the mean, with $p<0.05$ considered as statistically significant. The Pearson's correlation coefficient was used to determine the statistical significance of the relationships between the endocardial layer thickness and the amplitude of the Difference Between Normalized Spectra (DBNS) at individual wavelengths.

Figures 12A, 12B, 12C, 12D:
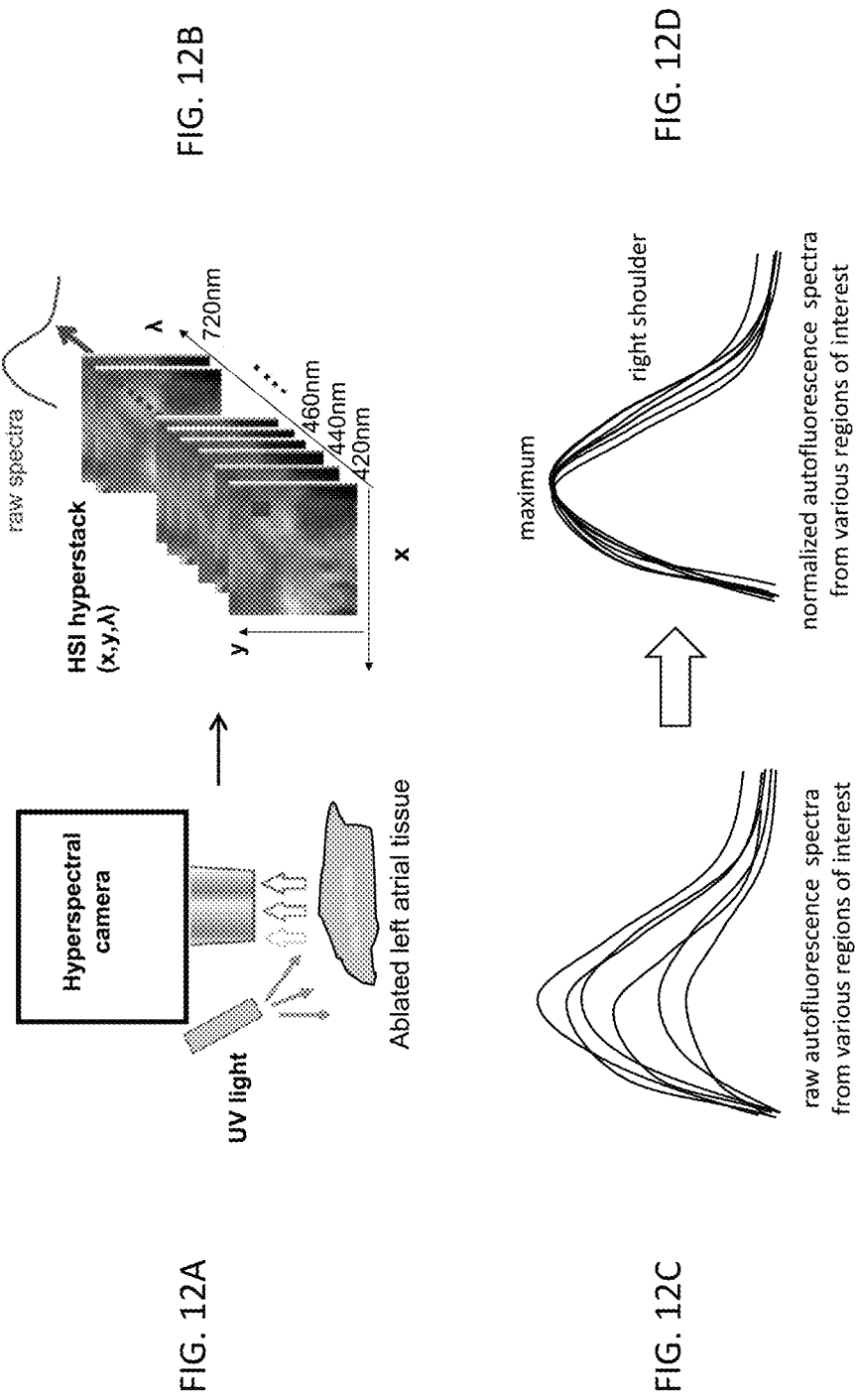
FIGS. 12A, 12B, 12C, and 12D illustrate a method for interrogating tissue using a hyperspectral camera to produce images at a plurality of wavelengths.

FIG. 12A-12D illustrate experiments leading to the dual wavelength approach for revealing tissue lesions. FIG. 12A illustrates an exemplary setup to extract raw autofluorescence spectra from each pixel of left atrial sample with multiple ablation lesions. In the example, a hyperspectral camera was used to collect the data at a plurality of wavelengths. In FIGS. 12B and 12C, raw spectra is extracted at a pixel at each wavelength, and each has different shapes and amplitudes. In FIG. 12D, the spectra were then normalized to the peak fluorescence value. For pixels from ablated sites, the right shoulder of the normalized spectra was found to be always higher than that of the unablated tissue.

RESULTS

Major Fluorophores of Cardiac Tissue Before and After RF Ablation

Figure 13A:
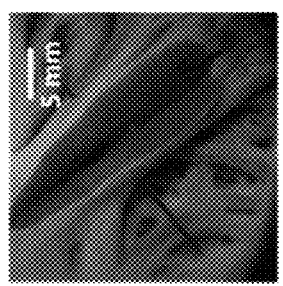
FIGS. 13A, 13B, 13C, 13D, and 13E show the two main layers facing the ablation catheter and their respective spectra.
Figure 13B:
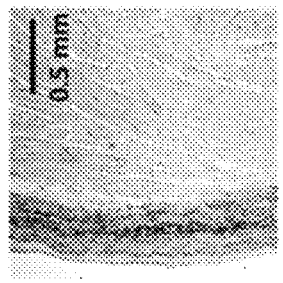

Cardiac muscle is covered by epicardial and endocardial layers of connective tissues, made predominantly from interwoven collagen fibers. The presented data are mainly from the endocardial surface of the left atrium (LA), where most ablations take place clinically and where the endocardium is the thickest. Spectral responses from ablation sites in other cardiac locations, including ventricular sites or epicardial surfaces, were conceptually similar (data not shown). FIGS. 13A and 13B illustrate the general structure of the cardiac wall to be ablated. Two structural components of the heart surfaces are facing the ablation catheter: a layer of connective tissue and a layer of cardiac muscle beneath it. When sufficient RF energy is applied, it penetrates all the way to the underlying muscle with the goal of destroying the cells that act as arrhythmogenic culprits. The major endogenous fluorophore inside the muscle cells is mitochondrial NADH with excitation/emission peaks of around 350 and 460 nm, respectively. Once the integrity of the cardiac muscle cells is destroyed due to RF or other means of ablation, the NADH levels irreversibly decline. The secondary fluorophores found in cardiac muscle cells include flavins, flavoproteins, lipids, lipofuscin, and lipid-protein conjugates. They fluoresce at longer wavelengths (<500 nm), but their overall signal from the unablated muscle is weaker compared to the NADH signal. Hereafter, they are referred to as 'yellow pigments.'

Figure 13C:
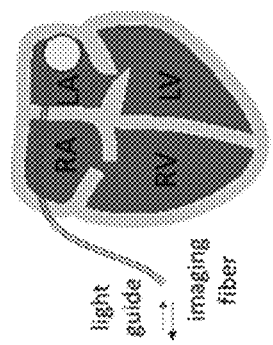
Figure 13D:
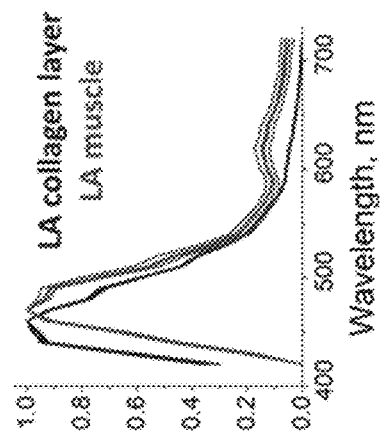
Figure 13E:
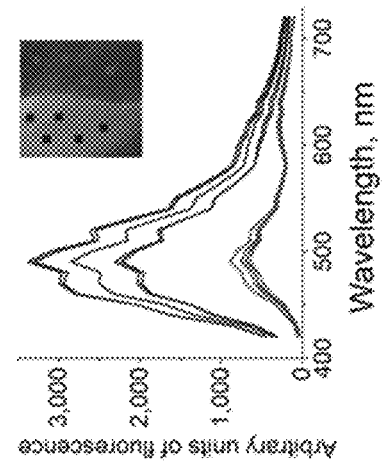

FIG. 13A is a depiction of a percutaneous imaging catheter and its positioning against the endocardial left atrial (LA) surface. FIG. 13B shows the histology of the LA wall showing the endocardial collagen layer and the muscle beneath it. FIG. 13C shows a piece of porcine LA under UV illumination. A cut was made in the middle to expose the muscle layer to show visually how much dimmer the muscle autofluorescence is when compared to the endocardial collagen layer. FIG. 13D shows raw spectra of endocardial collagen layer and the muscle beneath it from porcine LA. Individual traces show spectra from regions of interests (ROI) shown in the insert. FIG. 13E shows the same traces after normalization and adjustment for Nuance FX sensitivity. These two sets of graphs illustrate how dramatically spectral normalization reduces the variability of profiles from individual ROIs.

When looking at the muscle spectra shown in FIGS. 13A-13E, one can also notice an apparent 'peak' around 630 nm. This 'peak' is caused by an increased photon absorption by heme-containing myoglobin. Muscles appear red under white light illumination due to an abundance of myoglobin which absorbs 'green' and 'yellow' photons from 520-600 nm range. The presence of myoglobin also creates a dip in the same 'green-yellow' range of the spectrum emitted by NADH and other cardiac UV excitable fluorophores, leading to the apparent 630 nm 'peak.'

The main structural component of the endocardial layer is collagen. The latter is a highly fluorescent molecule with a broad absorption peak of around 300 nm. Even when illuminated with 350-375 nm UVA light (which is closer to the absorption peak of NADH), the intensity of the endocardial layer autofluorescence is still much higher than that of the muscle layer beneath (FIG. 13C). At this excitation range, the normalized emission spectra of these two layers largely overlap (FIG. 13D). When the endocardial collagen layer is heated during the RF ablation process, the amplitude of its autofluorescence transiently declines, only to quickly return to the original levels once the tissue cools down. As a result, when the LA endocardial surface is imaged postablation, the changes in its autofluorescence spectrum are minimal.

Paradoxically though, while the presence of the endocardial collagen layer obscures the drop in muscle NADH, it does, on the other hand, help to reveal an increase in the light scattering by the ablated muscle below. These two factors affect the difference between the normalized spectral profiles of native and ablated LA tissue. To understand the mechanism better, let us first examine how such difference traces were derived.

Differences Between Normalized Spectra of Native Versus Ablated Cardiac Tissues

Figure 14A:
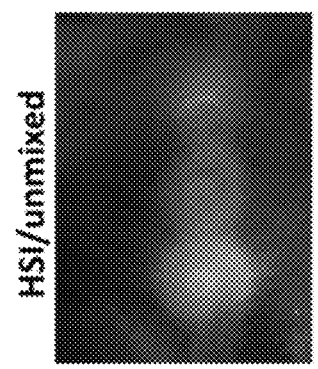
FIGS. 14A, 14B, 14C, and 14D show spectral profiles extracted from RF-ablated ventricular muscle and LA surface.
Figure 14B:
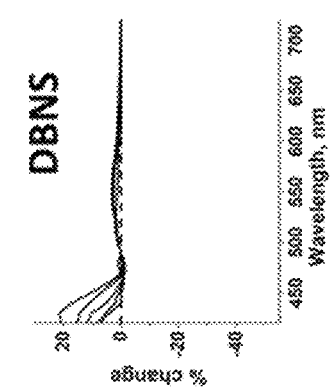
Figure 14C:
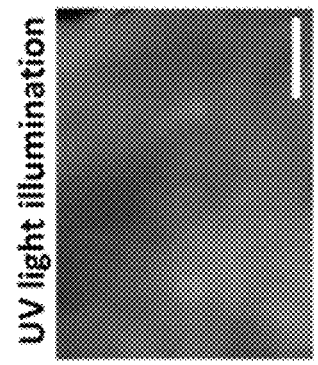
Figure 14D:
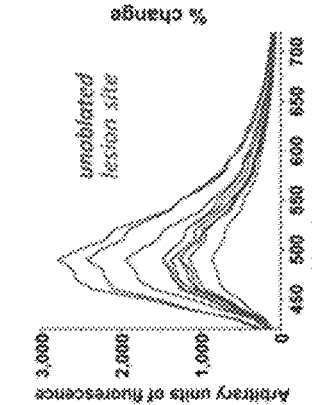

In the absence of a collagen layer, the differences in the autofluorescent profiles of native and ablated tissues illuminated with UV light are very pronounced. To illustrate this, FIGS. 14A and 14B show the visual appearance of a cross-sectioned bovine ventricular muscle illuminated with UV light. RF ablation of muscle leads to a prominent drop in the 450-480 nm range of the autofluorescence spectrum, which makes lesions appear yellowish on a blue background. The graph on the bottom left shows the raw spectral profiles taken from eight regions of interest (ROIs): four from the lesion sites and four from the proximal unablated tissue. The black traces on the right show the differences between normalized spectra from the ablated and the adjacent unablated sites, called DBNS. They are obtained by normalizing the raw spectra and adjusting them for the spectral sensitivity of the Nuance FX hardware. The greater the amplitudes of the DBNS and the more similar they are to each other, the better the outcomes of the post-acquisition unmixing. When ablations are done on ventricular muscle, the DBNS are very pronounced and uniform (FIGS. 14A-14D). The use of hyperspectral imaging enhances the visual appearance of the lesion sites, although they can also be observed by an unaided eye (compare FIGS. 14A and 14B). In FIG. 14A shows the visual appearance of ablated bovine ventricular slab with several lesions. FIG. 14B shows corresponding composite image from spectral unmixing of the hyperspectral dataset, with the green and red pseudocolors representing native and ablated tissues, respectively. FIG. 14C shows raw traces from lesions and neighboring tissue before any processing. FIG. 14D shows difference traces after raw traces were normalized and adjusted for equipment sensitivity.

Figure 15A:
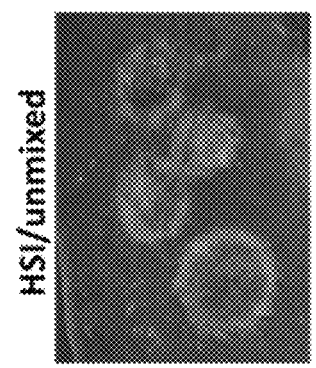
FIGS. 15A, 15B, 15C, and 15D shows the same as FIGS. 14A-14D but for ablated bovine LA with a thick collagen layer.
Figure 15B:
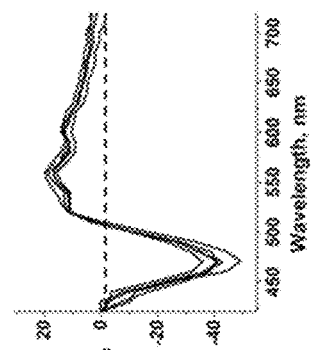
Figure 15C:
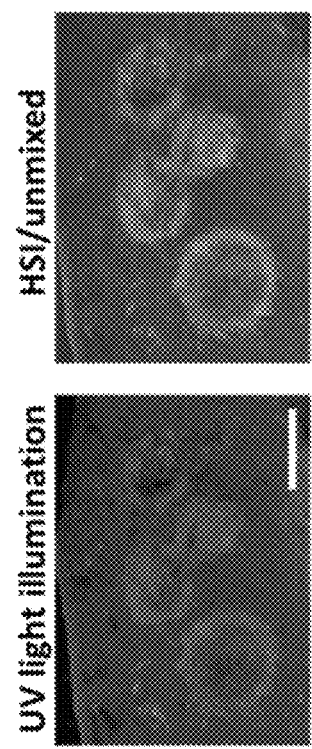
Figure 15D:
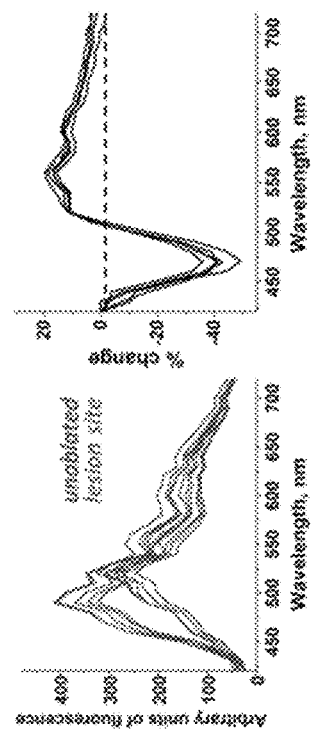

The situation changes considerably when RF lesions are made on cardiac muscle covered by a collagen layer thicker than ~100 microns. This is true for large mammals, including humans, where collagen layer thickness varies across the LA endocardial surface, ranging from 0.1 to 0.8 mm (Muselimyan, N., Al Jishi, M., Asfour, H., Swift, L., & Sarvazyan, N. A. (2017). Anatomical and optical properties of atrial tissue: search for a suitable animal model. *Cardiovascular engineering and technology*, 8(4), 505-514). FIGS. 15A-15D show an extreme case of DBNS from lesions made on bovine LA, where collagen layer thickness approaches 1 mm. The amplitudes of the raw autofluorescence profiles from the individual pixels become much more variable (FIG. 15C), while the DBNS are less pronounced (FIG. 15D). The drop in the 450-480 nm range disappears entirely and there is a noticeable rise within the 420-450 nm emission range. Although the amplitudes of these DBNS are much smaller and less consistent compared to the DBNS shown in FIGS. 14A-14D, post-acquisition processing of this hyperspectral dataset still enables distinguishing of the lesions (FIG. 15B). This was possible because the initial raw traces were acquired from the lesions made on the same piece of tissue. Therefore, all other conditions that can affect spectral difference between ablated and unablated tissues (and, consequently, the shape of DBNS), such as dissimilarities in tissue composition from different animals, time since heart excision, and storage conditions, were identical.

Figures 16A, 16B, 16C:
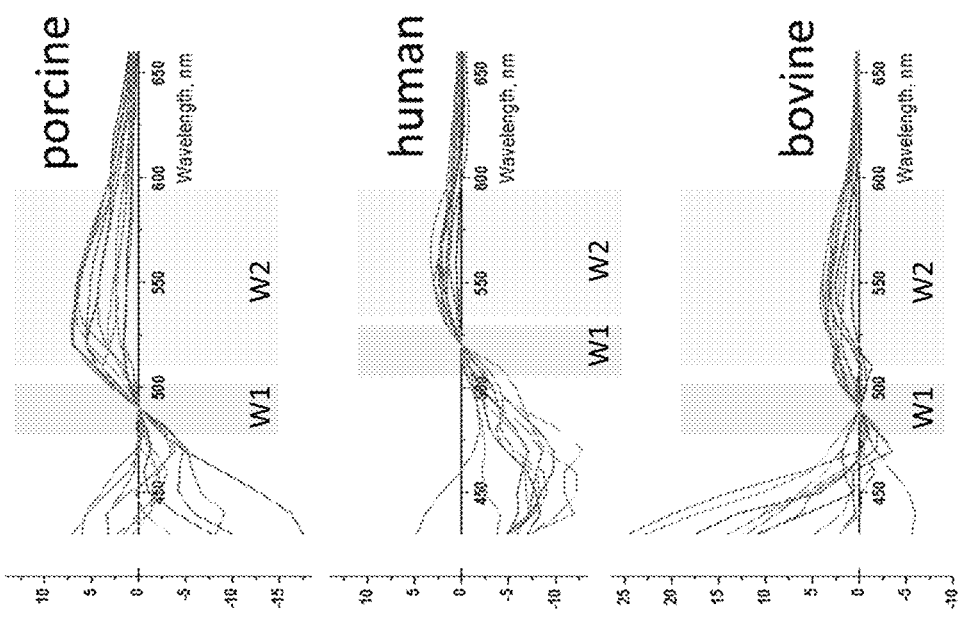
FIGS. 16A, 16B, and 16C show variability of traces showing the difference between the normalized spectra (abbreviated as DBNS traces)
Figures 19A, 19B, 19C, 19D:
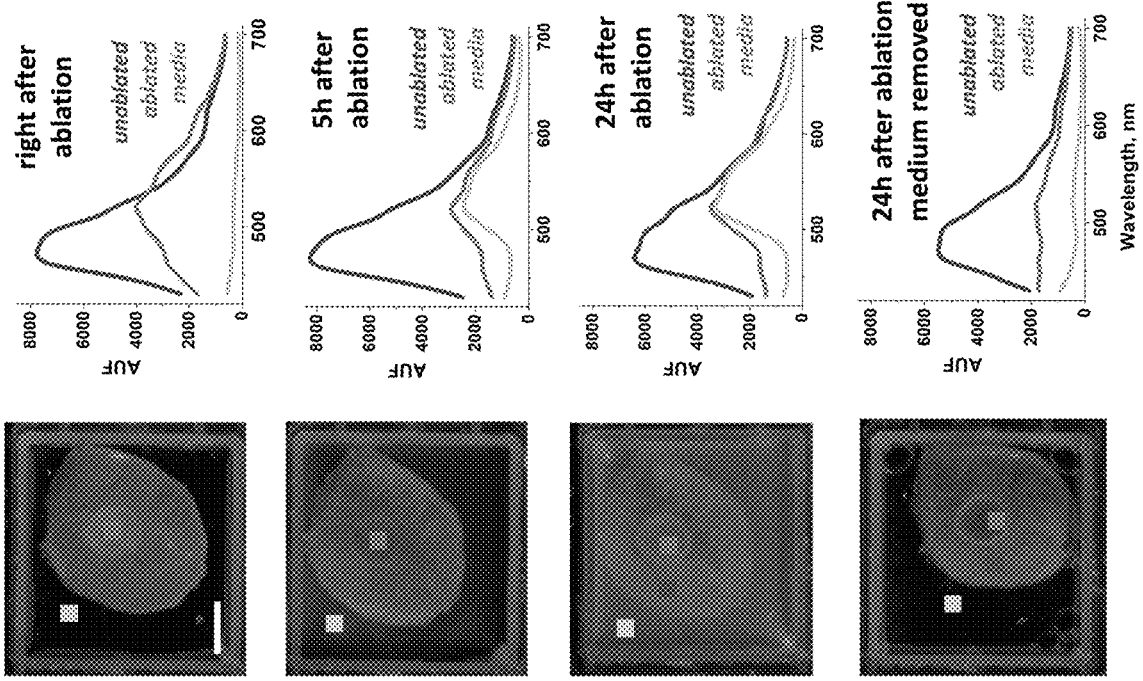
FIGS. 19A, 19B, 19C, and 19D show the formation and release of yellow pigments from three separate experiments.

However, much larger DBNS variability is expected between the samples from different individuals. This is because neither the subject nor the imaging conditions will be identical. FIGS. 16A 16B, and 16C illustrates such variability by showing the DBNS of different lesions from porcine, human, and bovine LAs. Such variability in DBNS traces interferes with the ability to use pre-acquired spectral libraries or other processing algorithms to reliably classify the pixels. Therefore, it is important to understand the main factors that can contribute to DBNS variability. By taking these factors into account, better protocols to acquire HSI datasets can be designed, whether for bench experiments or in vivo ablation procedures.

The illustrative twelve traces show variability of DBNS from different lesion sites and/or individual preparations from porcine (FIG. 16A), human (FIG. 16B), and bovine (FIG. 16C) species. All these species have a sizable collagen presence covering their respective left atrial surface.

Main Factors that Impact Changes in the Autofluorescence Spectrum of Ablated Cardiac Surface FIG. 17A depicts the interplay between multiple variables impacting the overall spectral response to the illumination of cardiac surfaces with UV light. The thickness of the upper collagen layer determines the intensity of its autofluorescence. The latter acts as a secondary light source that illuminates the muscle layer below. The optical response of the muscle layer depends on the degree of its thermal damage. Specifically, lesion severity determines: i) the amplitude of changes in the muscle autofluorescence caused by the loss of NADH and the rise in yellow pigments and ii) the degree with which the surface of ablated muscle reflects back photons coming from the endocardial collagen layer on top of it. The latter is a product of the layer thickness and collagen autofluorescence intensity. Any reflected taillight from the UV source might be also at play. The total amount of light coming back to the detector from the muscle layer is then affected by the thickness of the endocardial layer through which these photons must travel. The next sections present the results of experiments that examined how individual factors, denoted by the colored arrows in FIG. 17A and FIG. 17B, can affect the shape of DBNS. In these sections, references will be made back to the FIGS. 17C-17E cartoons that depict the overall directions of changes that these individual factors impose on DBNS traces.

Ablation-Induced Drop in NADH Autofluorescence

Ischemia leads to increased levels of NADH fluorescence in both blood and saline-perfused heart preparations. This is because only the reduced form of the molecule exhibits significant autofluorescence and the latter accumulates when oxygen is not available to pass electrons down the mitochondrial redox chain. After heart tissue is excised from an animal and/or taken off the perfusion system, its muscle cells gradually die, leading to a steady decline in tissue NADH levels. The rate of such decline depends on both the duration of storage and on temperature. To illustrate this effect, freshly excised saline-perfused rat ventricles were ablated, cut into semi-equal pieces and kept them at 4, 22, and 37° C. while spectra were acquired at multiple time points. The levels of NADH autofluorescence remained stable for hours when the samples were kept at room temperature (FIGS. 18A-18E) and for several days when the samples were kept on ice. By contrast, background autofluorescence rapidly declined in samples stored at 37° C. and, with it, the difference between the ablated and unablated tissues. Therefore, if tissue samples are not stored or transferred to the lab at the proper temperature, the NADH levels would start out low at the beginning of the experiment. Consequently, a much smaller drop in the 450-480 nm range will be recorded during the on-the-bench ablation experiment. On the other hand, if one performs ablation on a piece of freshly excised heart that is in the process of becoming ischemic, the ablation-induced NADH drop can be exaggerated.

FIGS. 18A and 18B show the visual appearance of an ablated rat ventricle cut into several pieces and stored at different temperatures under UV illumination from three separate experiments. FIGS. 18C, 18D, and 18E are graphs depicting the intensity values at 460 nm extracted from hyperspectral cubes.

Therefore, the exact amplitude of the NADH drop is affected by multiple factors including: i) amount of applied RF energy, ii) degree of tissue ischemia, and iii) storage conditions, including duration and temperature. However, regardless of its exact amplitude, NADH loss will always impact DBNS traces, as shown in FIG. 17C.

Ablation-Induced Release of Flavins and Lipid Peroxidation Products

RF energy heats tissue, which enhances the formation and release of secondary fluorophores from cardiac muscle cells. To demonstrate this process directly, an experiment shown in FIG. 19A-19D was performed. RF lesions were made on the left ventricles of freshly excised saline-perfused rat hearts. The hearts were immersed in saline and Auf-HSI datasets were acquired immediately at 5 and 24 h after ablation. At the end of 24 h, the media was replaced by fresh saline and the samples were re-imaged. The autofluorescence spectra were then extracted from the pixels corresponding to the unablated (red trace) and ablated (green trace) surfaces, as well as from the media (gray trace). The representative images and spectra next to them show an immediate ablation-induced drop in NADH, followed by a slow release of heat-induced yellow pigments into the media. At the end of 24 h, the spectrum of the media becomes identical to the spectra of the ablated muscle. Multiple compounds are believed to be responsible for the heat-induced appearance of yellow autofluorescent products, including flavins, lipofuscins, lipid-protein additives, and peroxidation products. Their formation contributes to the DBNS elevation in the 520-600 nm range, an effect observed in all tested species. The direction of wavelength-specific changes in the DBNS traces caused by the heat-induced release of yellow pigments is shown in FIG. 17D.

Figure 20A:
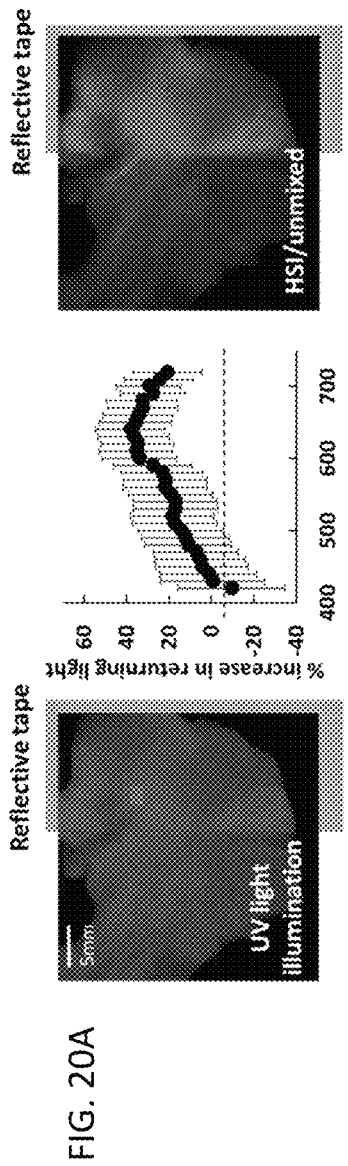
FIGS. 20A and 20B show the effect of the reflective surface beneath the endocardial layer.
Figure 20B:
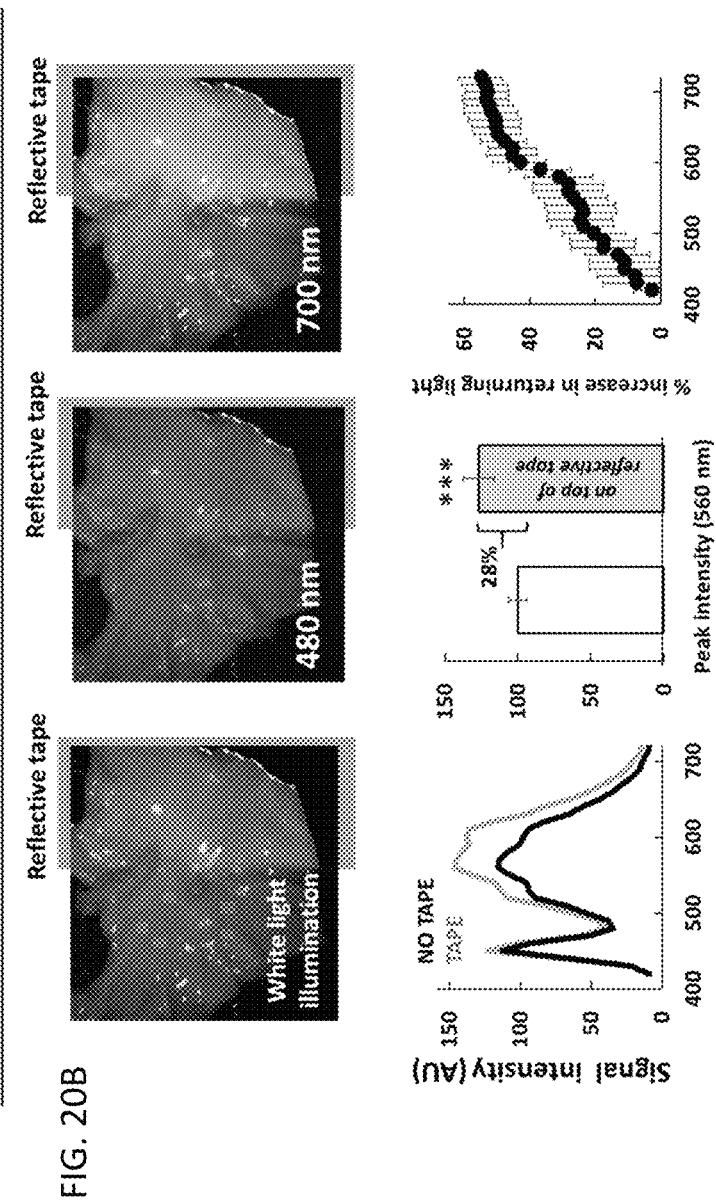

Reflection of Endocardial Collagen Autofluorescence by the Underlying Muscle Layer RF ablation increases the diffuse reflectance of the muscle due to an increase in its scattering coefficient, primarily due to protein coagulation. To directly illustrate the effect of increased reflectance by the bottom layer on DBNS traces, a piece of dissected bovine endocardium was placed on the top of a reflective tape, followed by Auf-HSI. The reflective tape beneath the endocardial layer led to a small increase in overall signal amplitude and a small yet consistent red shift in the normalized spectra of the returning spectra, which enabled the successful classification of the pixels on top of the reflective tape (FIG. 20A). To make these two effects more visually evident to the reader, a similar experiment using a broadband white LED light (Mightex 5500K) instead of UV LED was conducted. In the former case, it was not the autofluorescence of endocardial collagen layer, but photons from white LED that penetrated the layer and got reflected back. FIG. 20B shows an increase in the overall amplitude of the reflected light on the side of the reflective tape, with an elevated amount of returning photons at longer wavelengths visually evident (compare images from the 480 nm vs. 700 nm spectral bands extracted from a hyperspectral dataset).

FIG. 20A shows the appearance of a dissected bovine endocardium placed on top of a reflective tape and illuminated with 365 nm UV LED. Left: Visual appearance of the piece under UV light. The ROIs (region-of-interests) on each side were used to unmix the hyperspectral dataset (center). Right: Percent of intensity increase at each wavelength calculated as (Ftape−Fno tape)/Fno tape*100. In FIG. 20B, the upper row shows the appearance of detached bovine endocardium placed on top of reflective tape and illuminated with a broadband white LED light. The images taken at 480 and 700 nm help to visually illustrate the increased amount of returning photons at longer wavelengths. The bottom left row of FIG. 20B shows raw spectra showing the increased amplitude of the signals from the right side. The shape of the spectrum corresponds to the Mightex 5500K light source profile. The bottom center row of FIG. 20B shows the percent of increase in peak intensity at 560 nm averaged from 5 different ROIs. The bottom right row of FIG. 20B shows the relative increase in percent of photons at each wavelength calculated as (Ftape−Fno tape)/Fno tape*100.

Something similar, albeit smaller in amplitude, occurs when a layer of collagen is present on top of the ablated muscle. Specifically, the ablation-induced increase in muscle diffuse reflectance causes: i) increased contribution of collagen layer autofluorescence to the amplitude of the overall spectrum and ii) a red shift in the normalized spectral profiles. The latter is due to an increased proportion of photons with longer wavelengths that can pass through the collagen layer on their way back to the detector. The overall direction of wavelength-specific changes in DBNS traces caused by the increased reflection of endocardial collagen autofluorescence by the ablated muscle below is shown in FIG. 17E.

Impact of Endocardial Collagen Layer Thickness

To quantify how the thickness of the endocardial collagen layer impacts the amplitude of the acquired spectra and, consequently, the shape of the DBNS traces, two sets of measurements were conducted. First, the relationship between the thickness of the endocardial layer and the intensity of its autofluorescence was quantified. The endocardium was carefully dissected from the underlying muscle and folded in several places. This was followed by thickness assessment and concurrent Auf-HSI. The thickness values at each pixel were obtained from the optical density measurements using a trans-illumination setup. Maximum autofluorescence intensity was then derived from the Auf-HSI dataset. The data shown in FIG. 21A-21D confirmed that autofluorescence intensity is nearly linearly proportional to the endocardial layer thickness—up to almost 1 mm. Considering that the amplitude of muscle autofluorescence is 4 to 5 times lower than that of endocardial collagen (see FIG. 13D), these measurements implied that the absolute values of the peak autofluorescence across the LA surface can serve as a first-order quantitative indicator of endocardial layer thickness.

A piece of detached endothelium was folded several times to double and triple its thickness. Caliper measurements were used to translate optical density values to microns. FIG. 21B illustrates a graph that shows a near linear correlation between collagen layer thickness and its autofluorescence. Collagen autofluorescence was derived from intensity values of the 490 nm frame of the hyperspectral cube. Thickness values were estimated using transmission light measurements at 700 nm.

Figure 22A:
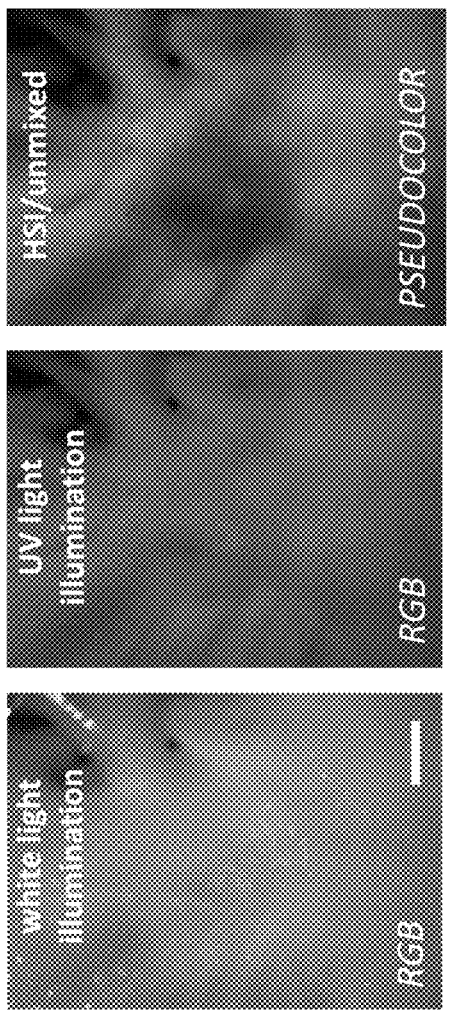
FIGS. 22A and 22B show the impact of collagen layer thickness on DBNS spectral shifts.
Figure 22C:
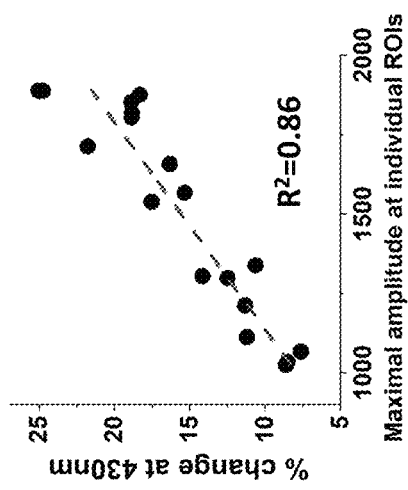
FIG. 22C depicts a graph showing a linear correlation between the values of DBNS shift at 430 nm and the intensity values at 490 nm, with the later serving as a first order estimate of collagen layer thickness.
Figure 22B:
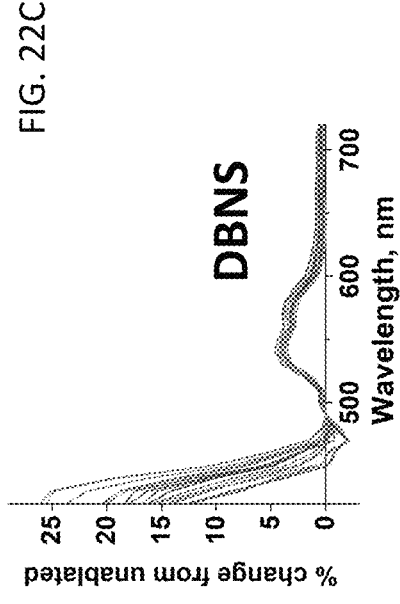

Another set of experiments involved a detailed analysis of an ablation lesion made on bovine LA with a particularly uneven endocardium averaging about 200 microns in thickness (FIG. 22A). Spectra from multiple ROIs within the lesion were acquired (FIG. 22B). Values of DBNS at each wavelength were then plotted against the peak amplitude of the spectrum. As mentioned in the previous paragraph, the latter can serve as an indicator of endocardial thickness at each specific ROI. This analysis revealed a highly significant positive correlation between DBNS shift for wavelengths in the 420-480 nm range and the endocardial layer thickness (FIG. 22C). These data indicate that the thicker the endocardium, the higher is the elevation of the left shoulder of DBNS. FIG. 22A shows a closeup of bovine LA with a radiofrequency lesion under white light and UV illumination. On the right is the ablation lesion revealed by hyperspectral approach. FIG. 22B shows spectra from eighteen 5×5 pixel ROIs acquired to plot multiple DBNS.

Optimization of Acquisition and Post-Processing Algorithms Based on DBNS Traces

A closer examination of the 'up' and 'down' trends across the DBNS traces (FIGS. 17A-17E) reveals that the three main variables have opposing effects on the 420-480 nm range. At the same time, all three variables, including drop in NADH, release of yellow pigments, and red shift in the reflected endocardial collagen spectra, lead to an elevation in the 500-600 nm range. This suggests that spectral changes in the 500-600 nm range can serve as a more reliable index to reveal ablated cardiac muscle in samples with variable thicknesses of collagen layer. Moreover, these observations imply that one can dramatically simplify the imaging and post-processing steps to reveal ablated tissue. This is shown in FIGS. 6A-6C and FIGS. 7A-7C, which displays the outcomes of the spectral unmixing of Auf-HSI datasets containing 32 spectral bands vs. a simplified procedure that uses only two spectral bands. Specifically, the grayscale tiff image corresponding to 550 nm was divided by the tiff image corresponding to 490 nm. Since 490 nm is the wavelength where the intensity of most pixels is the highest, this procedure corresponds to spectra normalization and reveals the 550 nm elevation in the DBNS traces across all pixels of the image. The ablation lesions can then be displayed using either a grayscale, pseudocolor, or 3D mesh. To reduce the noise, one can also sum up images from adjacent spectral bands in the 520-580 range, which corresponds to the widening of the optical filter during the acquisition.

The foregoing disclosure has been set forth merely to illustrate various non-limiting embodiments of the present disclosure and is not intended to be limiting. Since modifications of the disclosed embodiments incorporating the spirit and substance of the disclosure may occur to persons skilled in the art, the presently disclosed embodiments should be construed to include everything within the scope of the appended claims and equivalents thereof. All patent and non-patent references recited in this application are incorporated herein by reference in their entireties.

The invention claimed is:

1. A system for interrogating tissue comprising:
a light source providing ultraviolet light for illuminating a tissue region comprising one or more lesions from ablation;
a sensor being configured to receive light to detect autofluorescence from the illuminated tissue region, the sensor detecting autofluorescence at one or more first wavelengths in a first wavelength range, and detecting autofluorescence at one or more second wavelengths in a second wavelength range such that first wavelength range is from 460 nm to 510 nm and the second wavelength range is from 530 nm to 600 nm; and
a processor programmed to:
generate at least one first digital representation of the tissue region from autofluorescence detected in the first wavelength range and at least one second digital representation of the tissue region from autofluorescence detected in the second wavelength range;
generate a final digital representation from the at least one first digital representation and the at least one second digital representation by subtracting the at least one first digital representation from the at least one second digital representation and to divide a resulting digital representation by the at least one first digital representation, wherein the final digital representation distinguishes between ablated and non-ablated tissue; and
display the final digital representation to distinguish between ablated and non-ablated tissue during a tissue ablation procedure.

2. The system of claim 1, further comprising an ablation device having an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy.

3. The system of claim 1, wherein the processor is further programmed to optimize a contrast and brightness of the final digital representation of the illuminated tissue to distinguish between ablated tissue and non-ablated tissue.

4. The system of claim 1, wherein the processor is further programmed to display the final digital representation in pseudo colors, as a 3-D mesh, or a graphical representation.

5. The system of claim 1, wherein the light source is between 300 nm and 400 nm.

6. The system of claim 1, wherein the sensor is configured to convert an optical image into an electronic signal.

7. The system of claim 1, further comprising an elongated body having a distal end and a proximal end.

8. The system of claim 7, further comprising an ablation device disposed at the distal end of the elongated body for ablating the tissue.

9. The system of claim 7, further comprising one or more optical fibers configured to extend through the elongated body to deliver the light from the light source to the tissue and to deliver fluorescence to the sensor.

10. The system of claim 7, further comprising an inflatable balloon disposed about the distal end of the elongated body.

11. A method for interrogating tissue comprising:
illuminating with ultraviolet light from a light source an area of tissue, including tissue treated by ablation and surrounding tissue, to excite the area of tissue;
detecting with a sensor the area of tissue to detect light in a first wavelength range and in a second wavelength range, where the first wavelength range is from 460 nm to 510 nm, and the second wavelength range is from 530 nm to 600 nm;
generating at least one first digital autofluorescence representation of the area of tissue from light detected in the first wavelength range and at least one second digital autofluorescence representation of the area of tissue from light detected in the second wavelength range;
producing a final digital representation of the illuminated tissue by subtracting the at least one first digital autofluorescence representation from the at least one second digital autofluorescence representation and to divide a resulting digital representation by the at least one first digital autofluorescence representation, the final digital representation illustrating ablated tissue as having different color or gray scale pixel intensity than non-ablated tissue; and display the final digital representation to distinguish between ablated and non-ablated tissue during a tissue ablation procedure.

12. The method of claim 11, further comprising ablating the tissue with an ablation device, wherein the ablation device has an energy source selected from the group consisting of radiofrequency energy, microwave energy, electrical energy, electromagnetic energy, cryoenergy, laser energy, ultrasound energy, acoustic energy, chemical energy, electroporation, pulsed field ablation, and thermal energy.

13. A system for interrogating tissue comprising:
a delivery device having a distal end and a proximal end;
an ablation device disposed at the distal end of the delivery device for ablating tissue;
a light source providing light between about 300 nm and about 400 nm for illuminating a tissue to excite the tissue;
a sensor being configured to receive light between 460 nm and 600 nm to detect fluorescence from the illuminated tissue, the sensor detecting light at a first wavelength in a first wavelength range from 470 nm to 510 nm selected based on a primary fluorophore in the tissue and detecting light at a second wavelength in a second wavelength range from 530 nm to 600 nm; and
a processor associated with the sensor and configured to generate a digital representation of the illuminated tissue to distinguish between ablated tissue and non-ablated tissue, the digital representation being generated from at least one first digital autofluorescence representation of the tissue from light detected in the first wavelength range and at least one second digital autofluorescence representation of the tissue from light detected in the second wavelength range by subtracting the at least one first digital autofluorescence representation from the at least one second digital autofluorescence representation and to divide a resulting digital representation by the at least one first digital autofluorescence representation,
wherein the processor is further configured to display the digital representation to distinguish between ablated and non-ablated tissue during a tissue ablation procedure.

14. The system of claim 13, wherein the delivery device is an endovascular catheter having an inflatable balloon at the distal end.

15. A system for interrogating tissue comprising:
an ablation device for ablating tissue;
a light source providing light between about 300 nm and about 400 nm for illuminating a tissue to excite the tissue;
a sensor being configured to receive light between 460 nm and 600 nm to detect fluorescence from the illuminated tissue, the sensor detecting light at a first wavelength in a first wavelength range from 460 nm to 510 nm selected based on a primary fluorophore in the tissue, and detecting light at a second wavelength in a second wavelength range from 530 nm to 600 nm; and
a processor associated with the sensor and configured to generate a digital representation of the illuminated tissue to distinguish between ablated tissue and non-ablated tissue, the digital representation being generated from at least one first digital autofluorescence representation of the tissue from light detected in the first wavelength range and at least one second digital autofluorescence representation of the tissue from light detected in the second wavelength range by subtracting the at least one first digital autofluorescence representation from the at least one second digital autofluorescence representation and to divide a resulting digital representation by the at least one first digital autofluorescence representation,
wherein the processor is configured to display the digital representation to distinguish between ablated and non-ablated tissue during a tissue ablation procedure.

16. A system for interrogating tissue comprising:
a light source providing ultraviolet light for illuminating a tissue region comprising one or more lesions from ablation;
a sensor being configured to receive light to detect autofluorescence from the illuminated tissue region, the sensor detecting light at one or more first wavelengths in a first wavelength range from 460 nm to 510 nm such that the first wavelength range includes a peak intensity of autofluorescence from the illuminated tissue region and detecting light at one or more second wavelengths in a second wavelength range from 530 nm to 600 nm such that the second wavelength range is 20 nm to 100 nm longer than the first wavelength range; and
a processor programmed to:
generate at least one first digital autofluorescence representation of the tissue region from light detected in the first wavelength range and at least one second digital autofluorescence representation of the tissue region from light detected in the second wavelength range;
generate a final digital representation from the at least one first digital autofluorescence representation and the at least one second digital autofluorescence representation by dividing the at least one second digital autofluorescence representation by the at least one first digital autofluorescence representation, wherein the final digital representation distinguishes between ablated and non-ablated tissue; and
display the final digital representation to distinguish between ablated and non-ablated tissue during a tissue ablation procedure.

* * * * *